(12) United States Patent
Huber

(10) Patent No.: US 6,416,244 B1
(45) Date of Patent: Jul. 9, 2002

(54) FURNITURE FITTING

(75) Inventor: Edgar Huber, Hard (AT)

(73) Assignee: Julius Blum Gesellschaft m.b.H., Höchst (AT)

( * ) Notice: Subject to any disclaimer, the term of this patent is extended or adjusted under 35 U.S.C. 154(b) by 0 days.

(21) Appl. No.: 09/341,180

(22) PCT Filed: Nov. 6, 1998

(86) PCT No.: PCT/AT98/00274

§ 371 (c)(1),
(2), (4) Date: Jul. 6, 1999

(87) PCT Pub. No.: WO99/24723

PCT Pub. Date: May 20, 1999

(30) Foreign Application Priority Data

| Nov. 7, 1997 | (AT) | 1882/97 |
| Feb. 20, 1998 | (AT) | 0308/98 |

(51) Int. Cl.[7] ............................................. B25G 3/28
(52) U.S. Cl. ..................... 403/277; 248/73; 403/224; 403/322.4; 403/321; 403/282
(58) Field of Search ................... 248/71, 73; 403/282, 403/281, 274, 278, 321, 322.3, 322.4, 277

(56) References Cited

U.S. PATENT DOCUMENTS 3,192,820 A * 7/1965 Pitzer .......................... 248/73
3,709,088 A * 1/1973 Pitzer .......................... 248/73
4,141,108 A * 2/1979 Busse
5,615,851 A * 4/1997 LeBeau ....................... 248/73

FOREIGN PATENT DOCUMENTS

| DE | 0 610 765 | * 1/1994 |
| DE | 295 06 600 | * 10/1995 |
| DE | 298 04 684 | * 7/1998 |
| EP | 0 698 357 | 2/1996 |
| EP | 0 755 640 | * 5/1997 |

* cited by examiner

Primary Examiner—Lynne H. Browne
Assistant Examiner—Tomlyne Malcolm
(74) Attorney, Agent, or Firm—Wenderoth, Lind & Ponack, L.L.P.

(57) ABSTRACT

The invention is directed to a furniture fitting that is detachably fastened to a furniture part. The fitting comprises a fitting body removably mounted on the furniture part, an expansion sleeve insertible into an opening arranged in the furniture part, and an expansion portion for the expansion sleeve and passing through the fitting body. A peg or bolt is provided for connecting the expansion portion to the expansion sleeve. The expansion portion has a body preferably tapered, at one end, and is articulated, at the opposite end, to a tiltable clamping lever supported by the fitting body. The fitting body includes projections directed towards the expansion portion. The expansion portion abuts a shoulder of each projection.

42 Claims, 25 Drawing Sheets

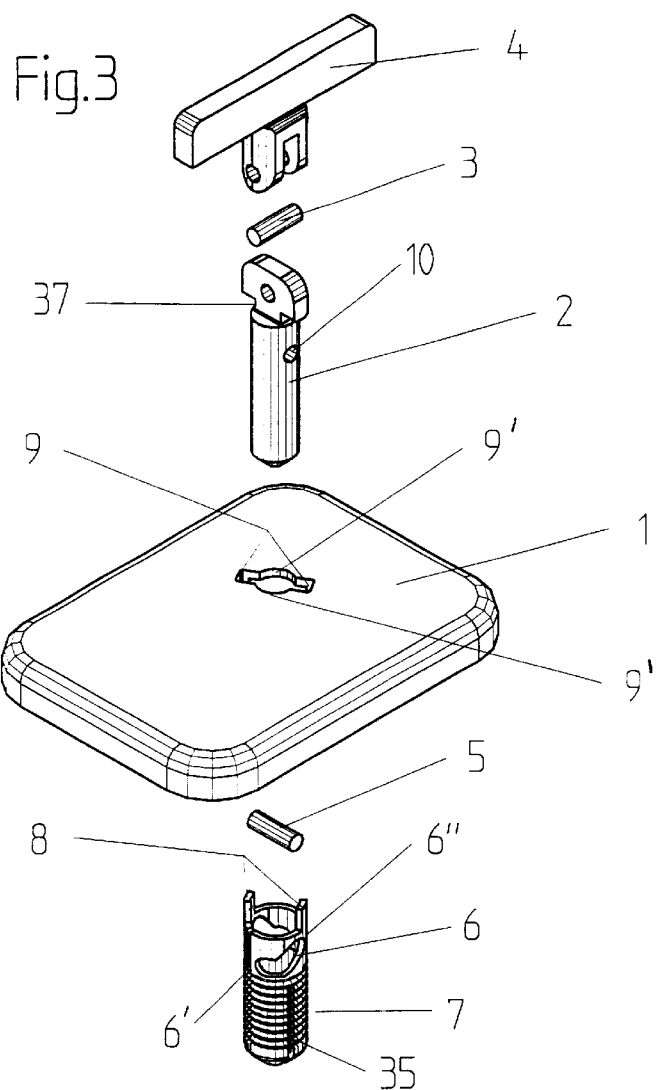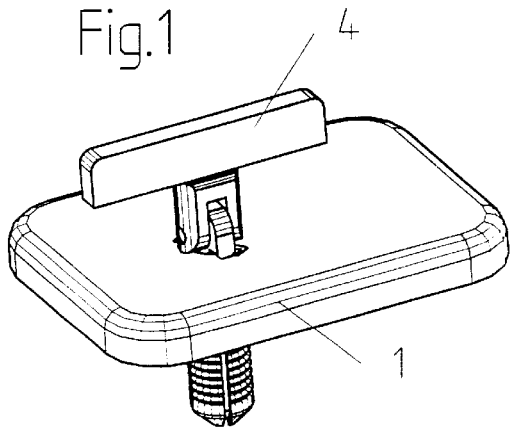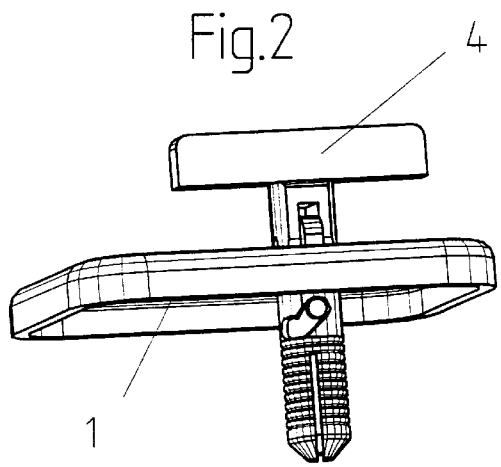

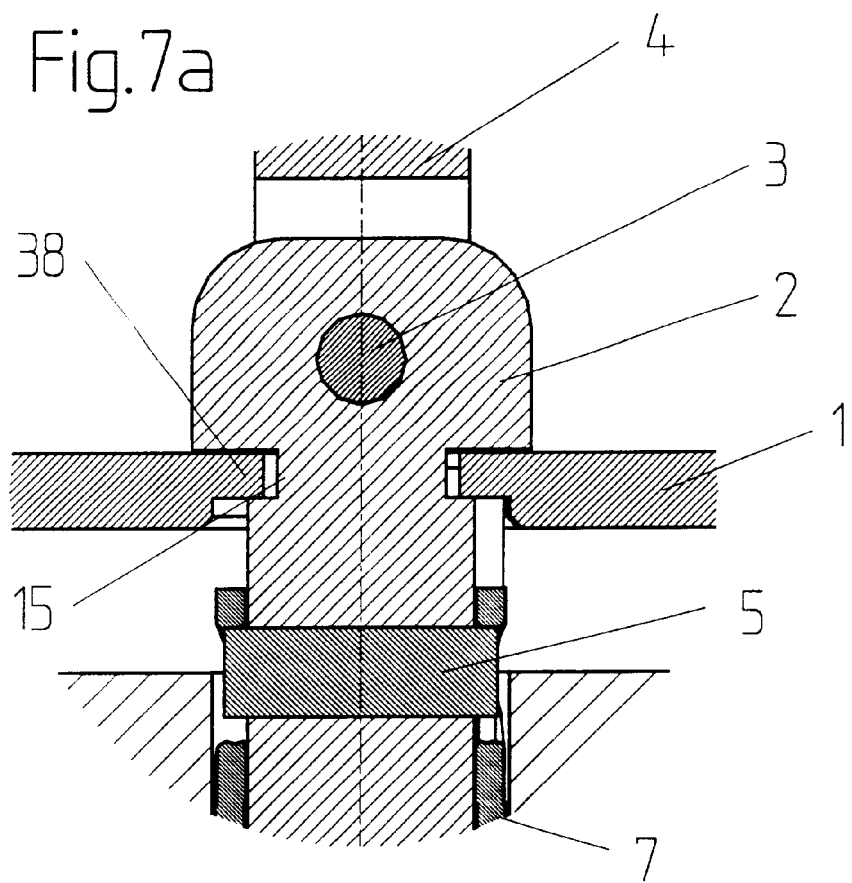
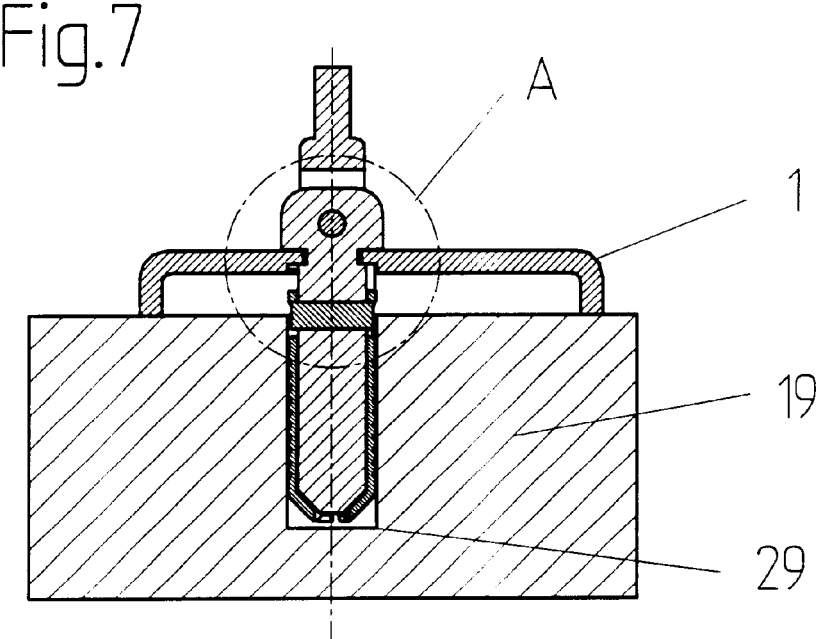

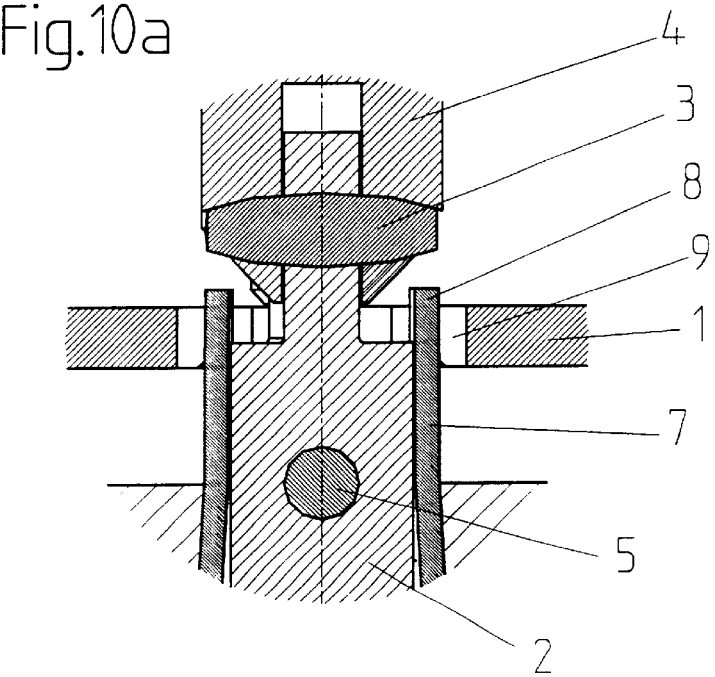
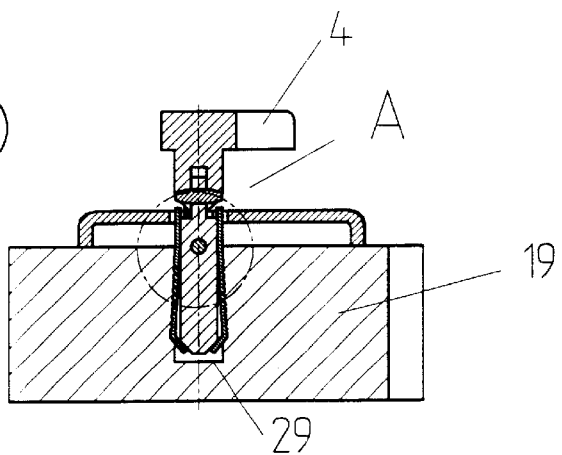
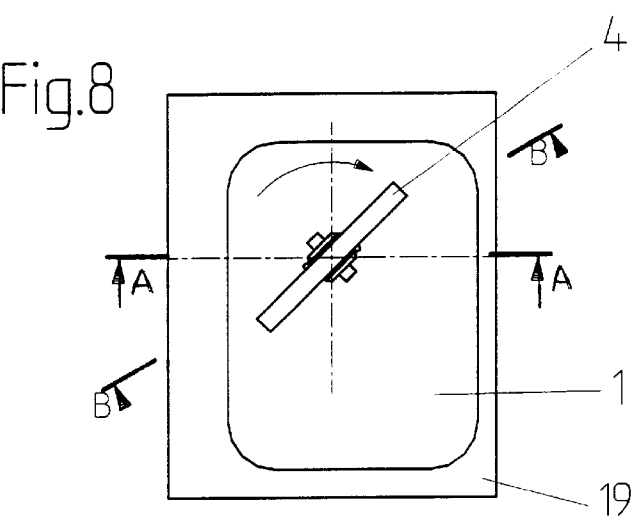
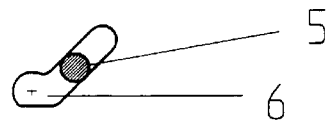

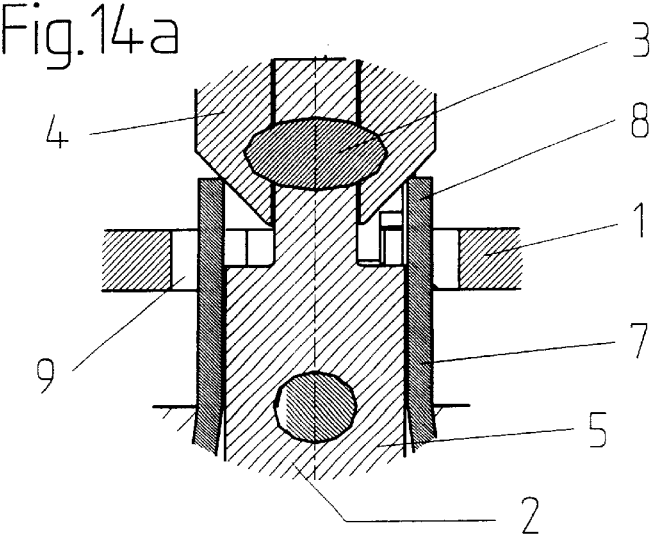
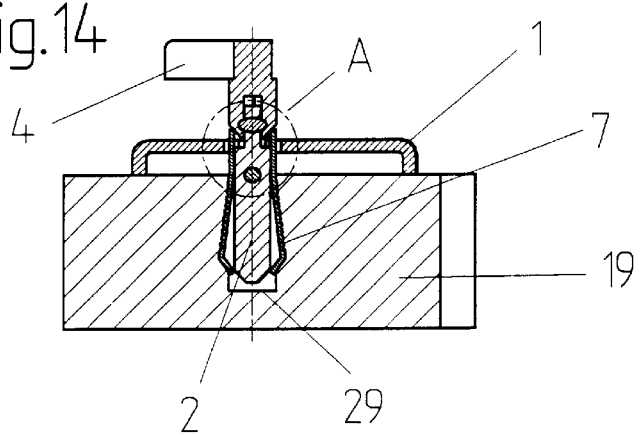
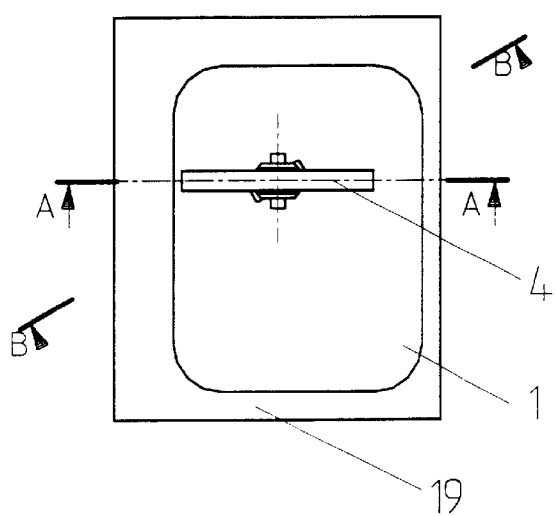
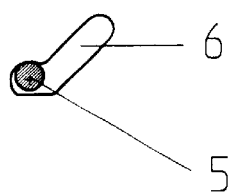

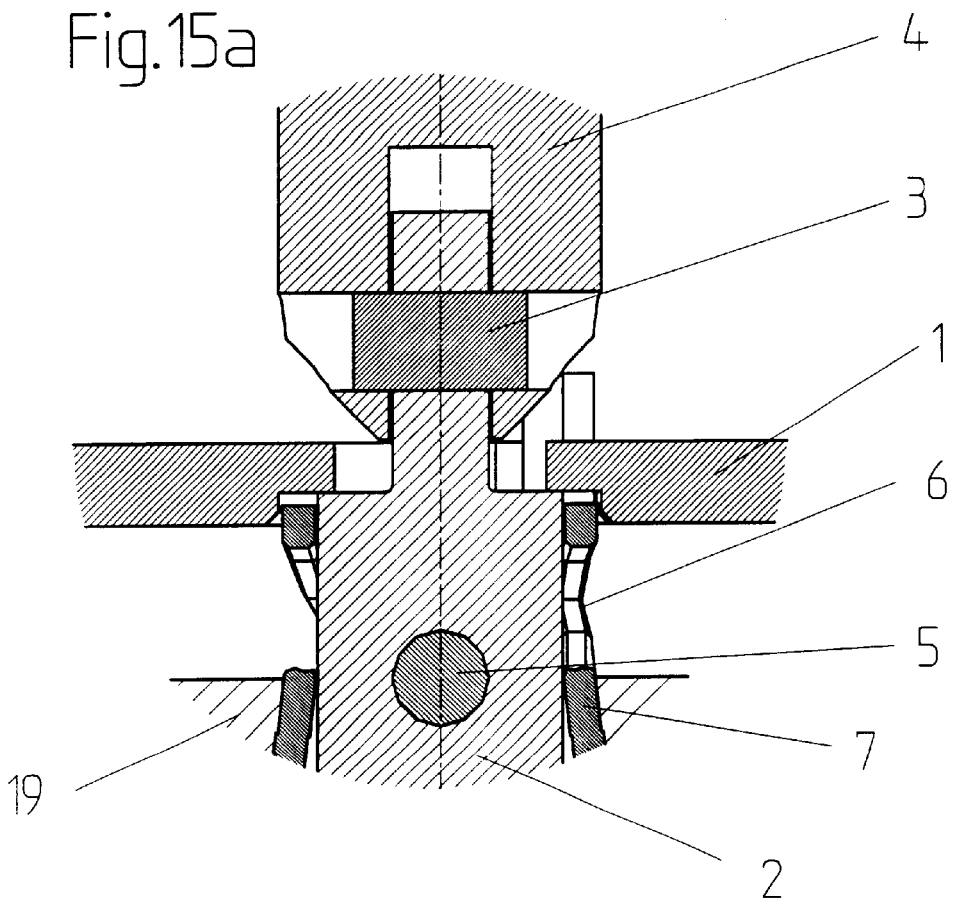
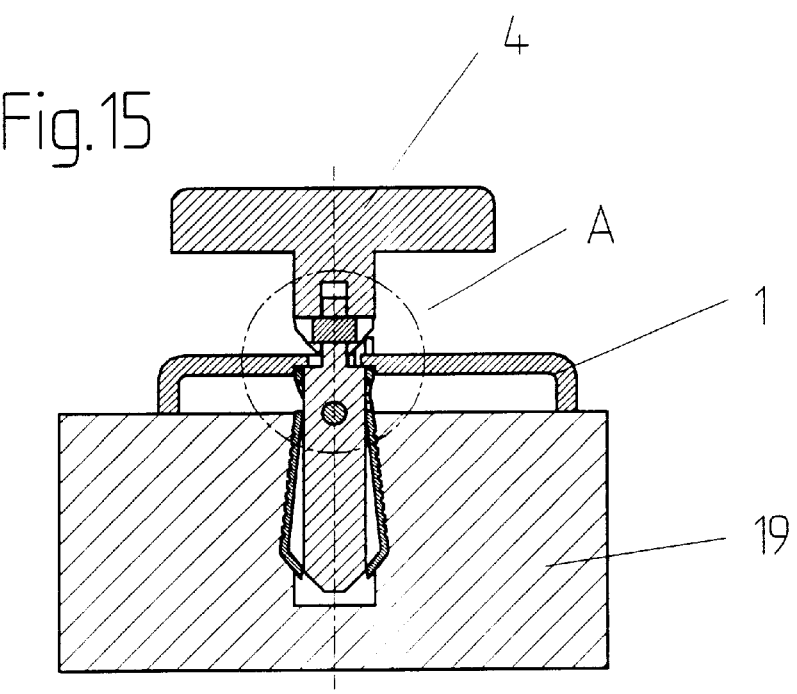

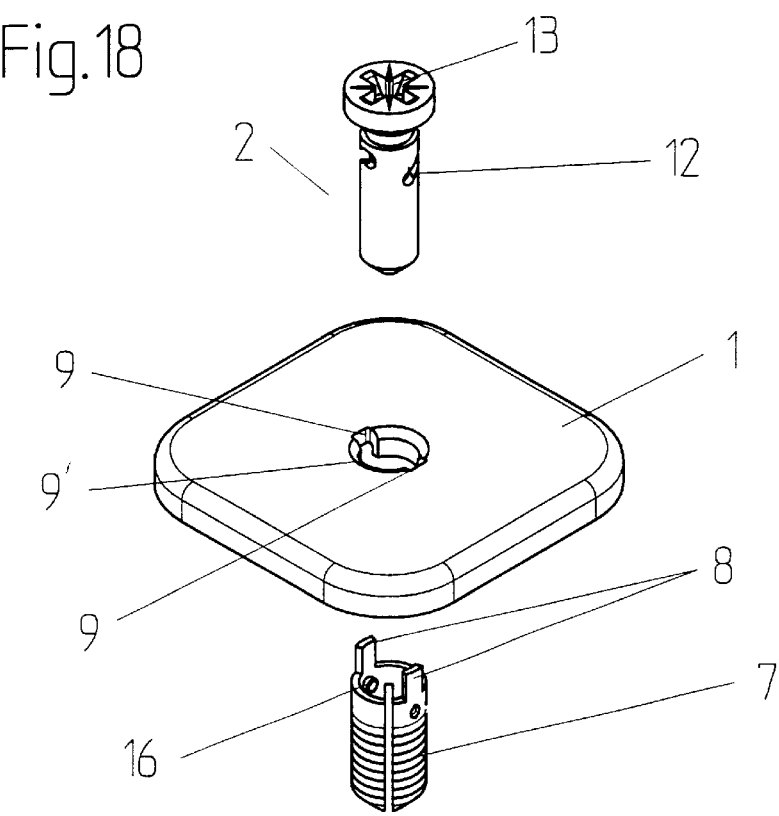
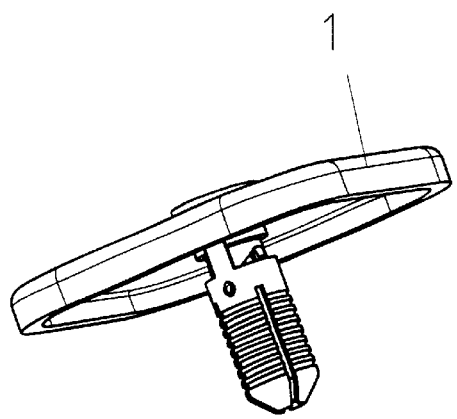
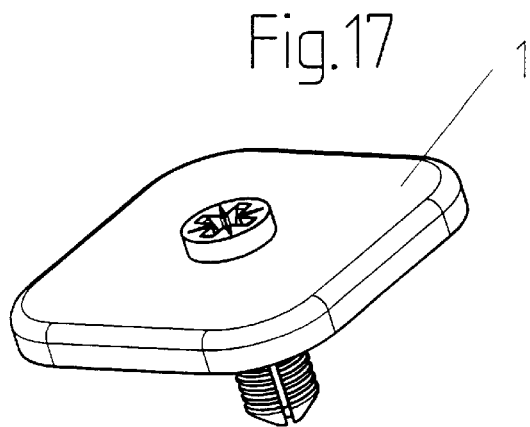

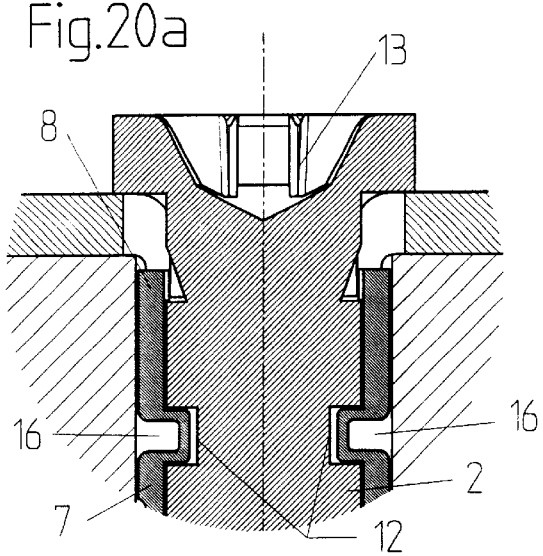
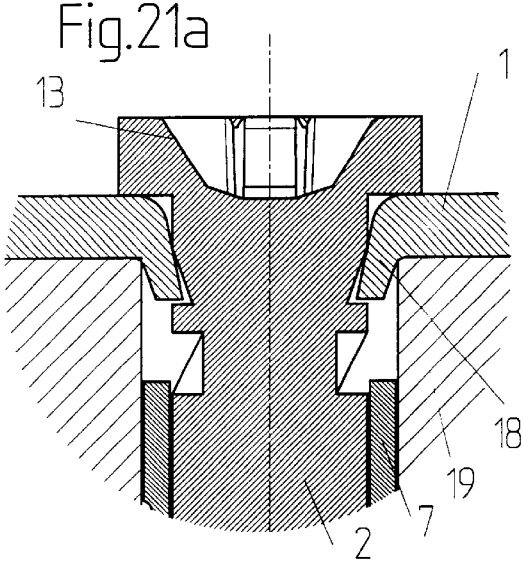
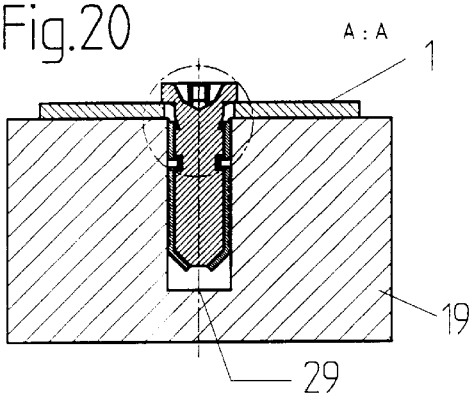
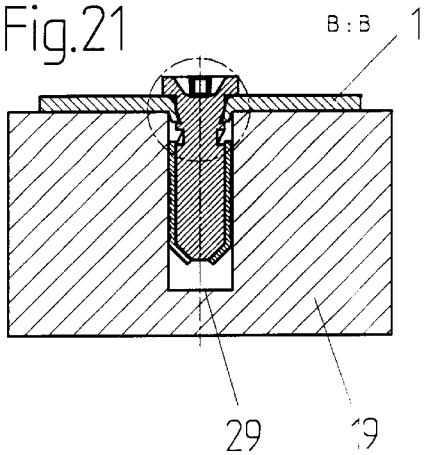
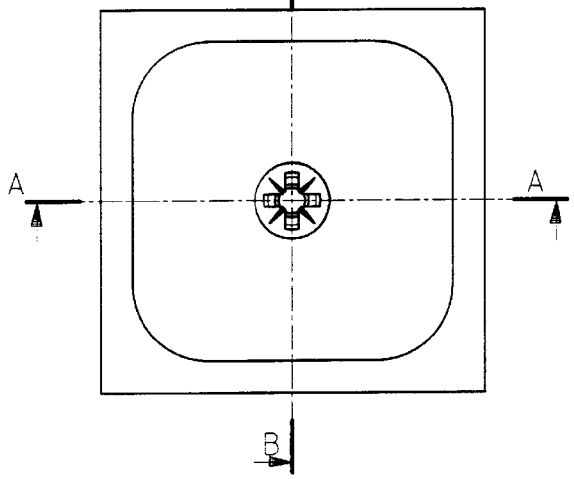

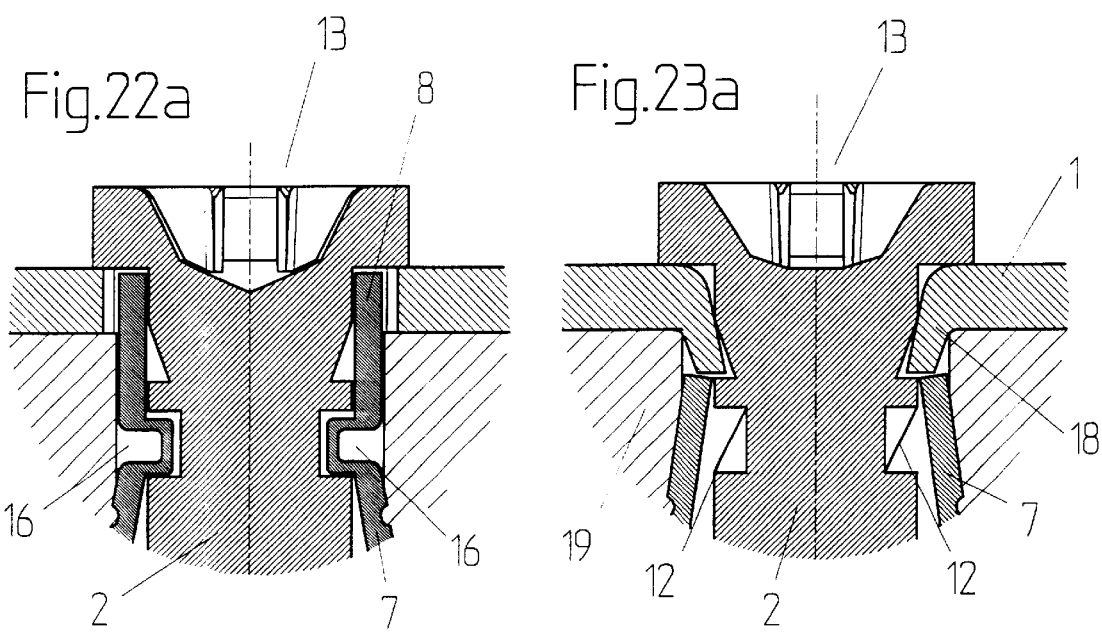
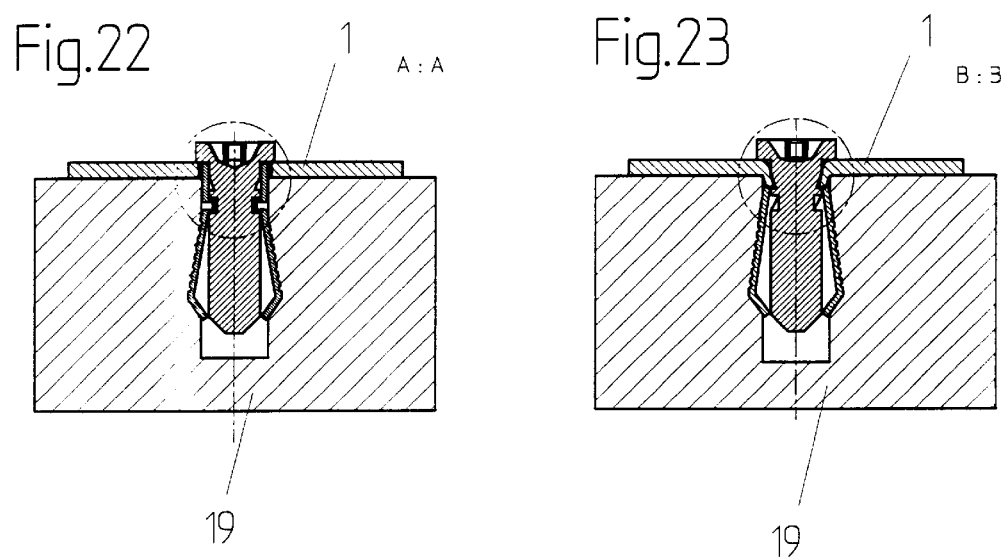

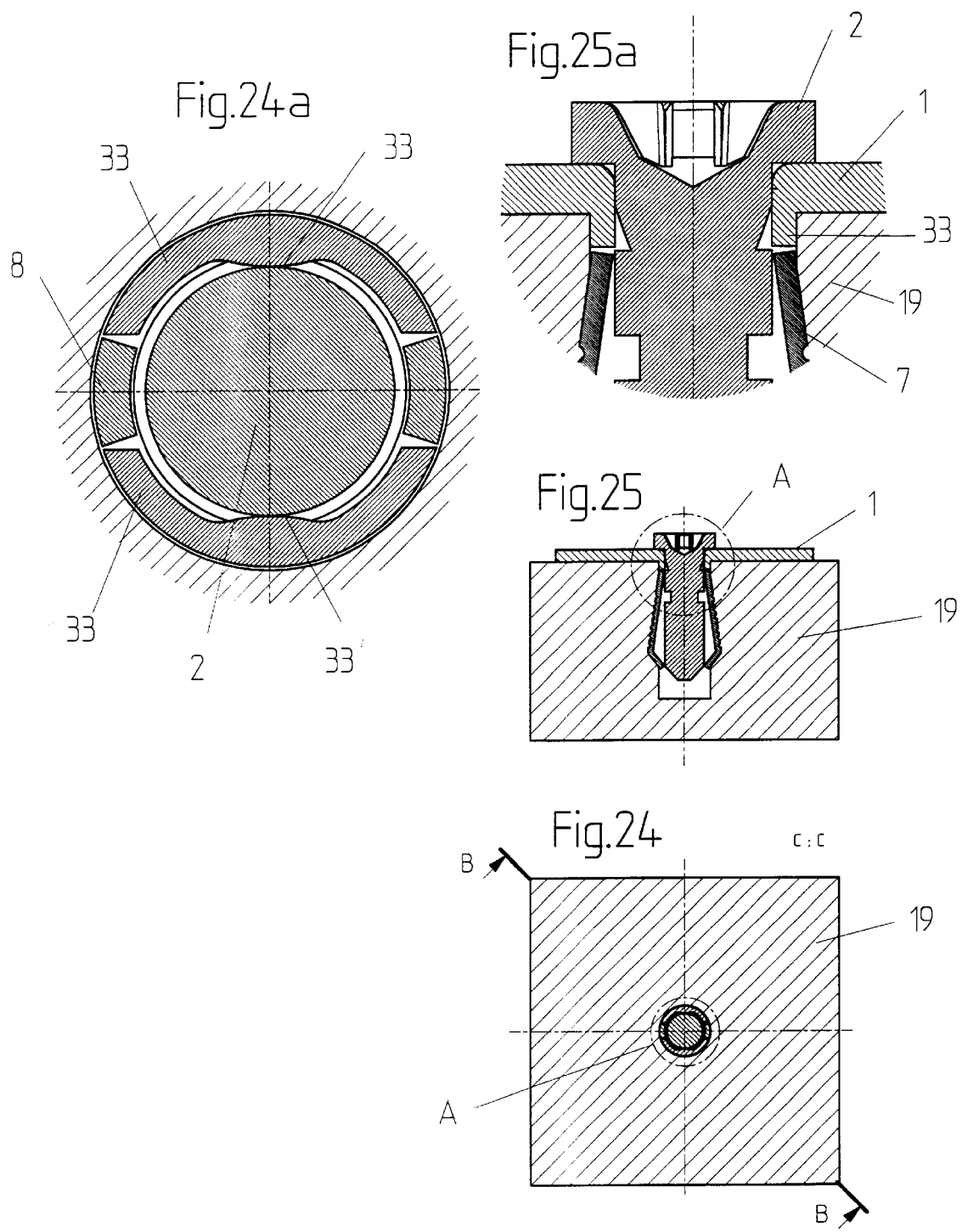

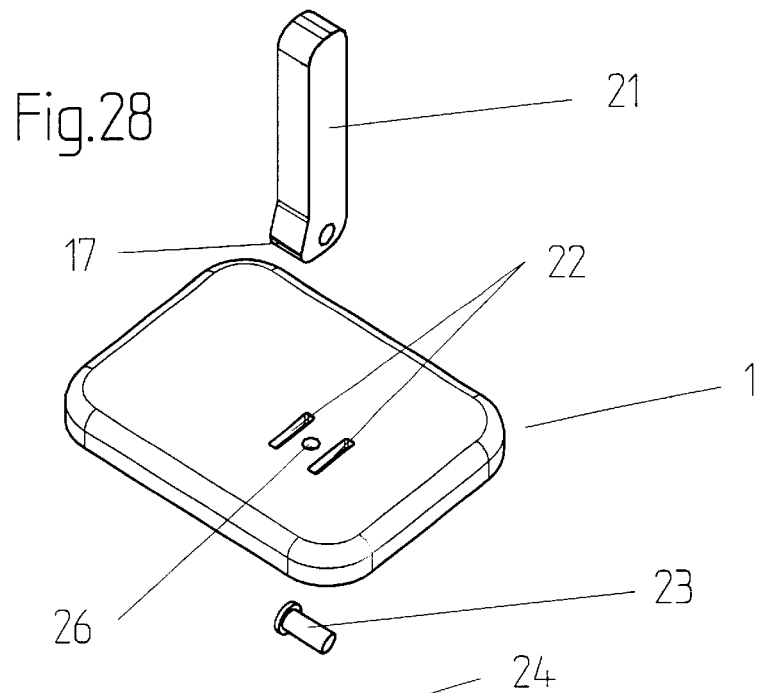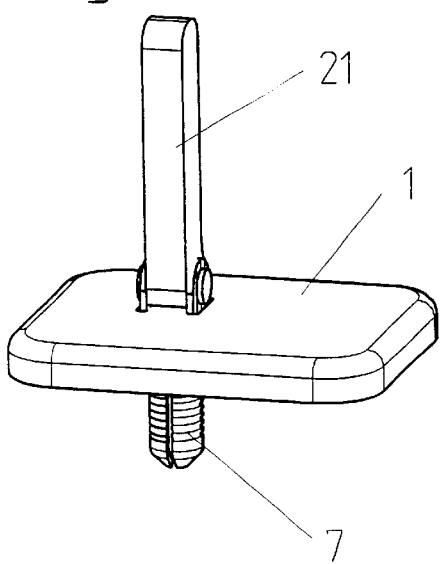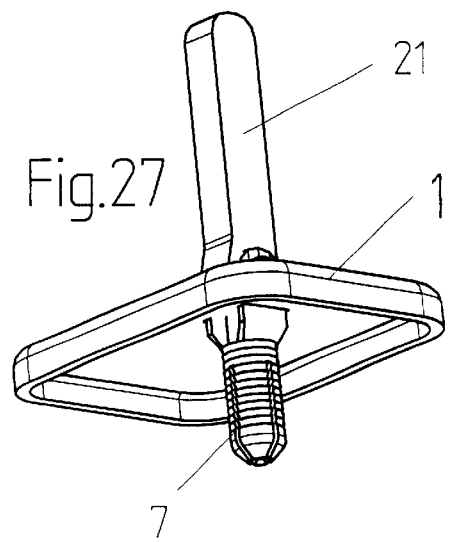

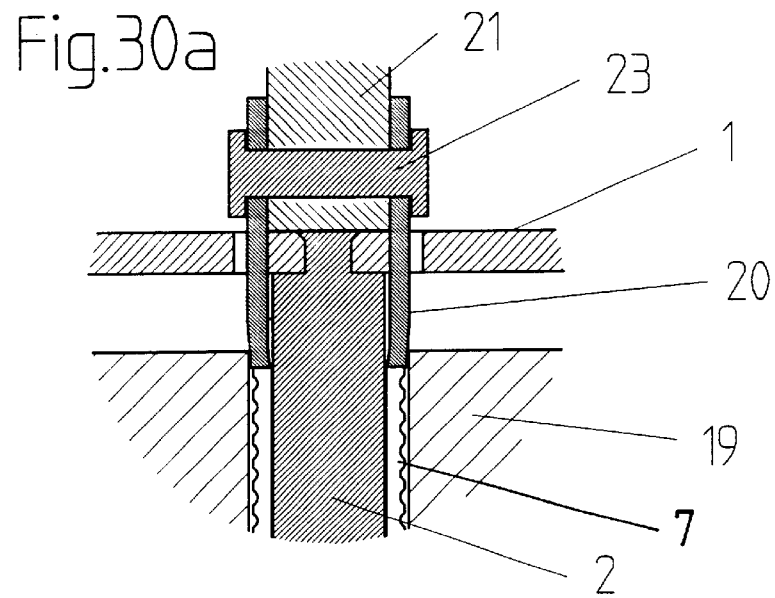
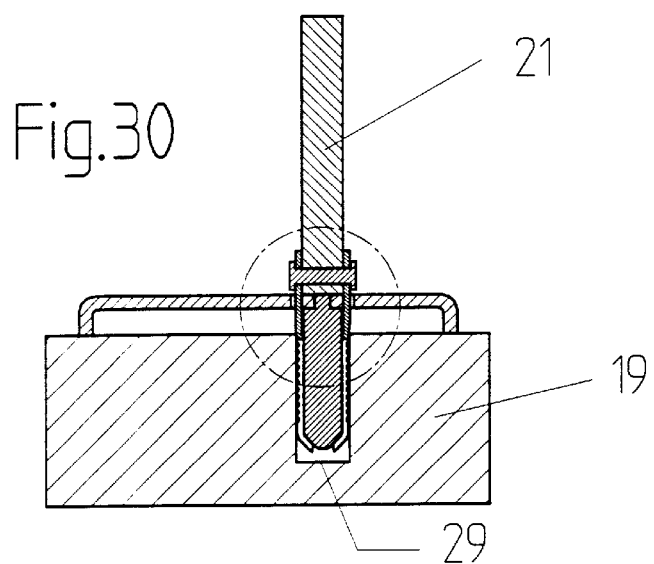
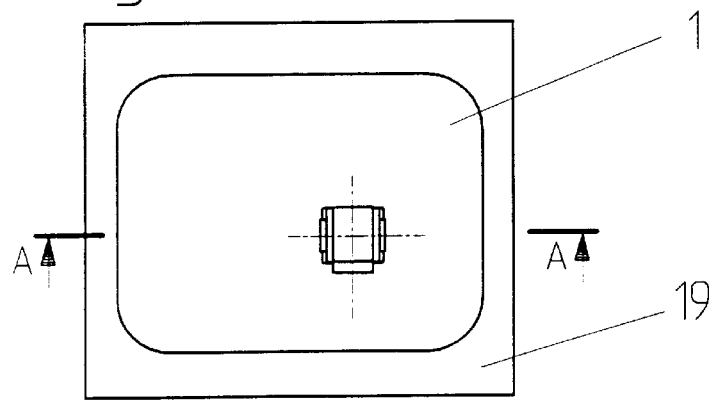

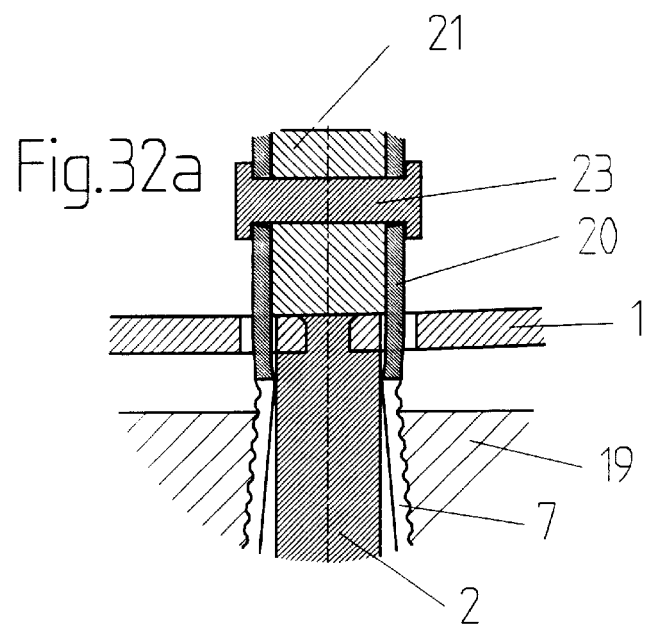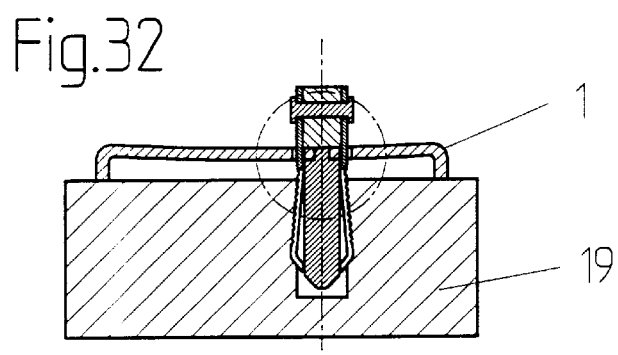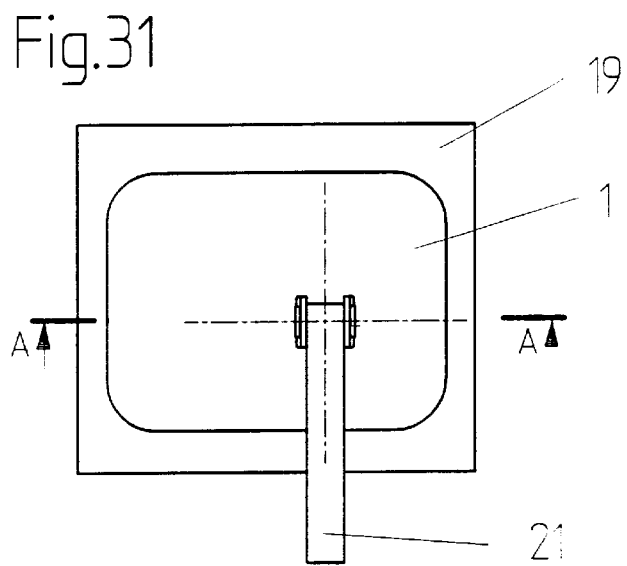

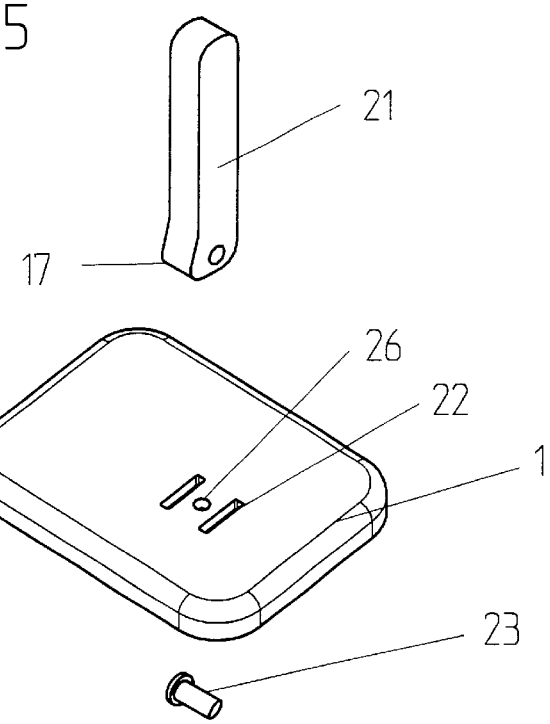
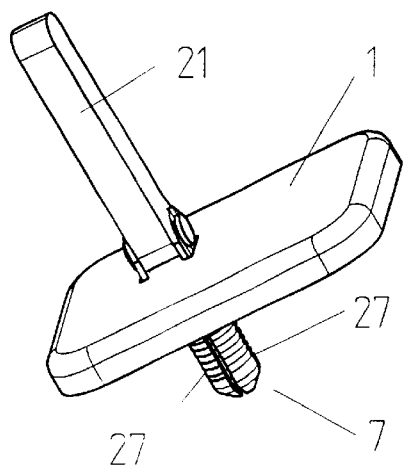
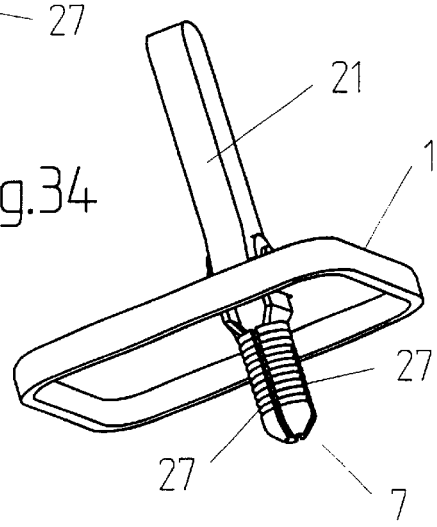

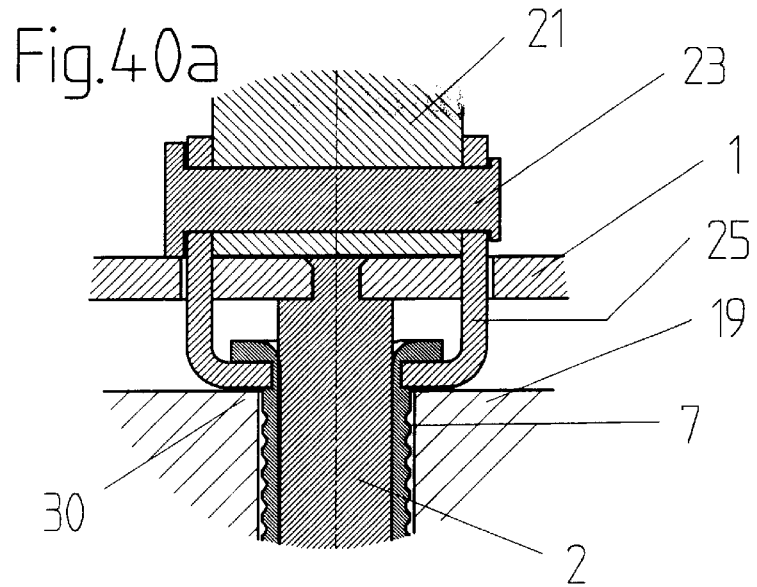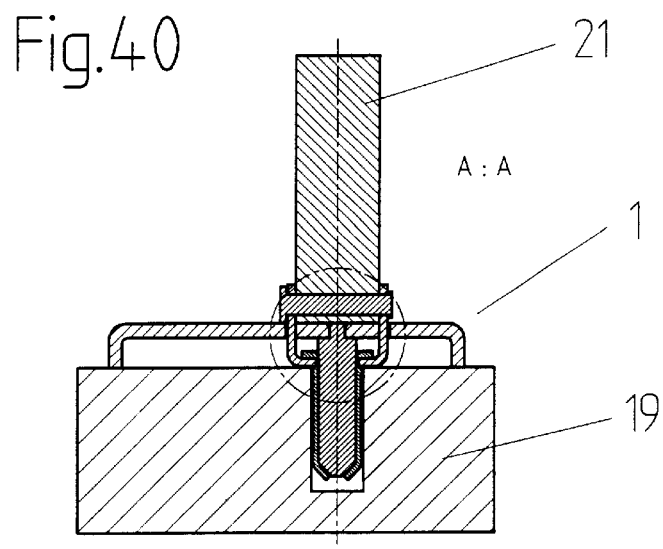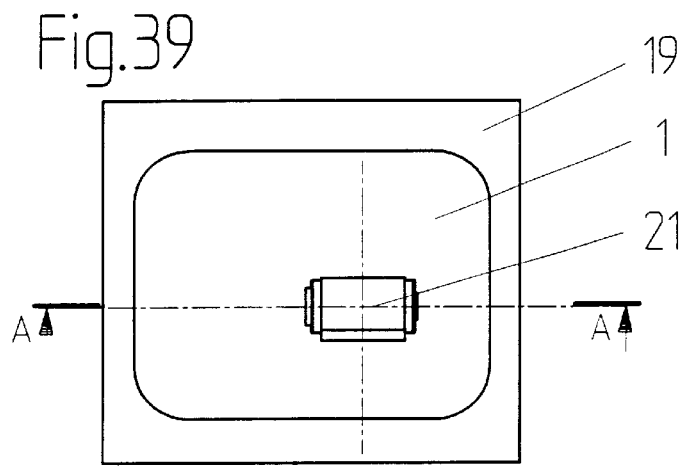

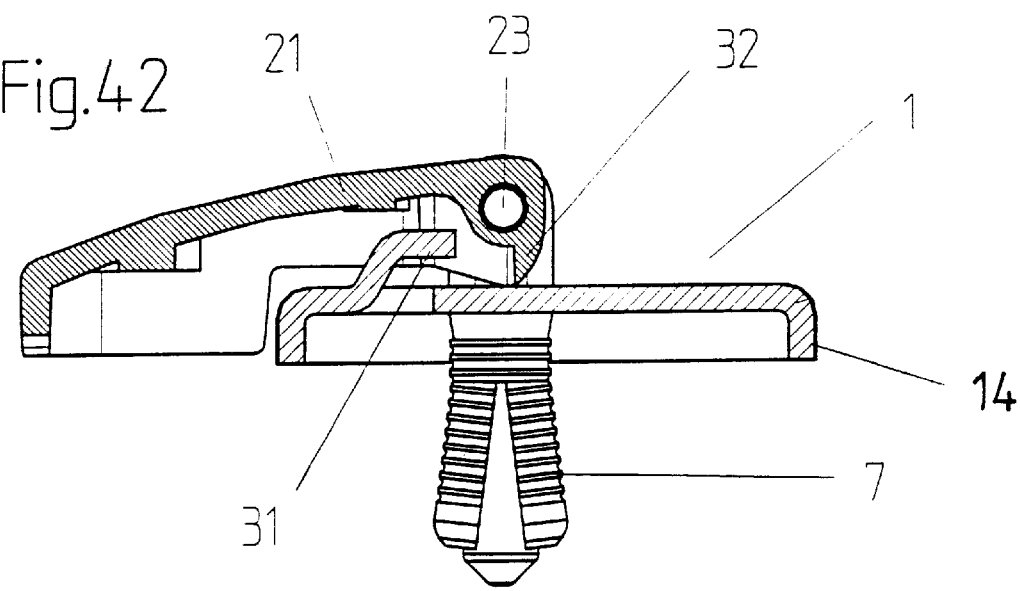
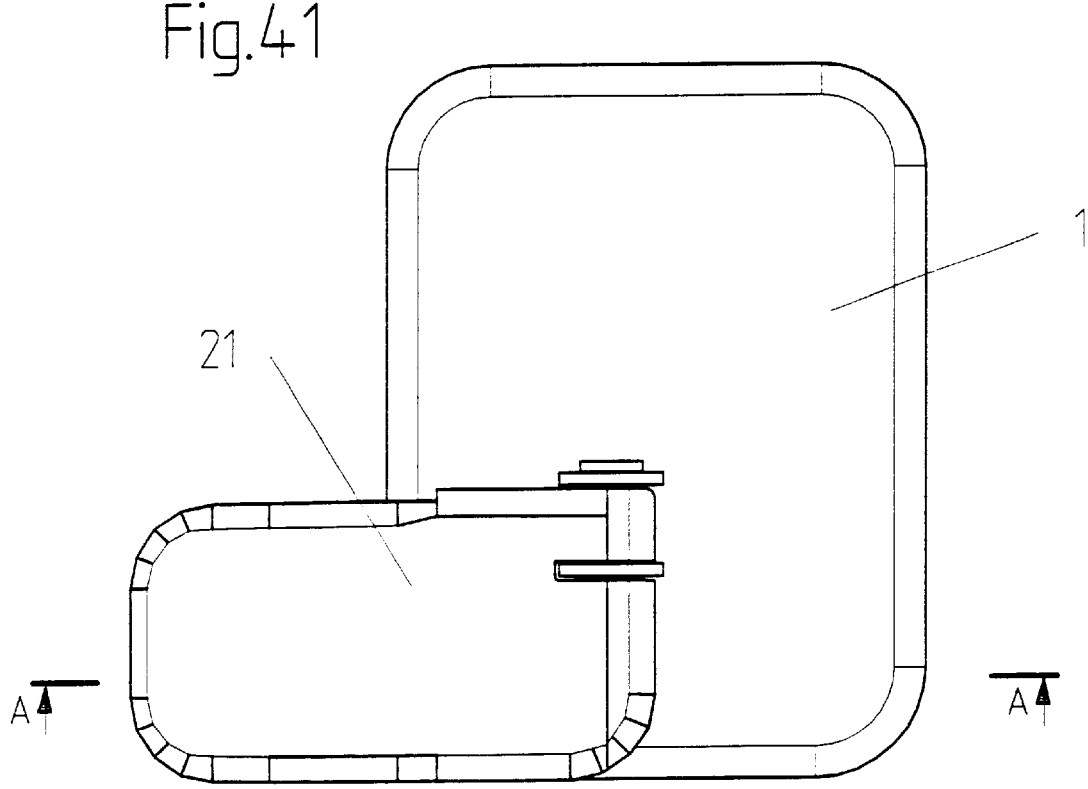

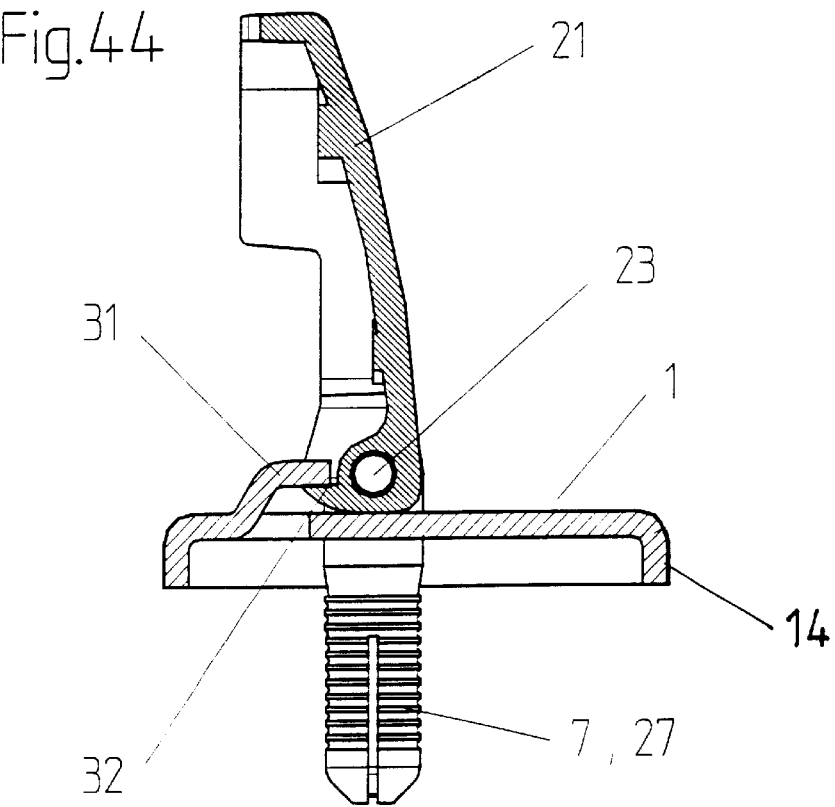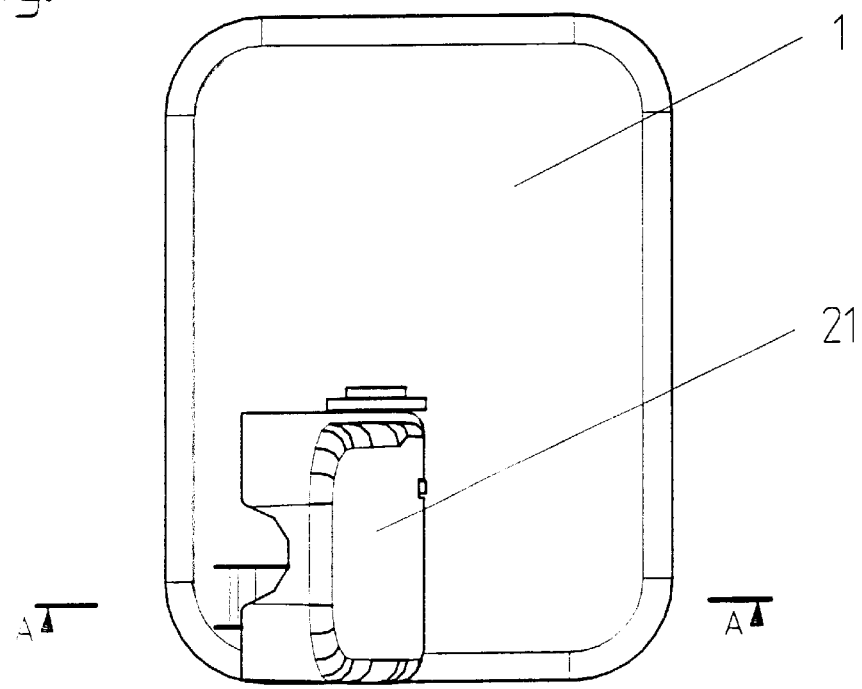

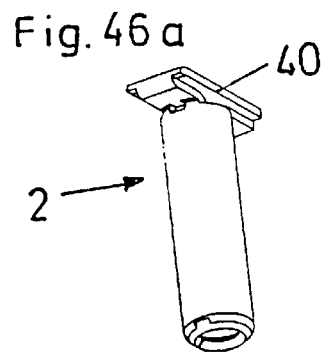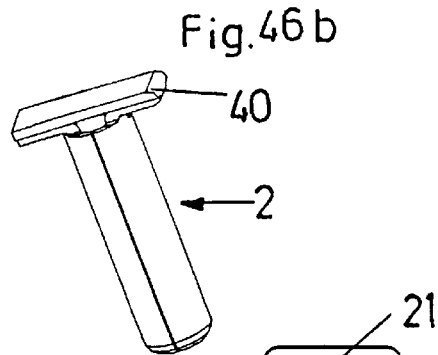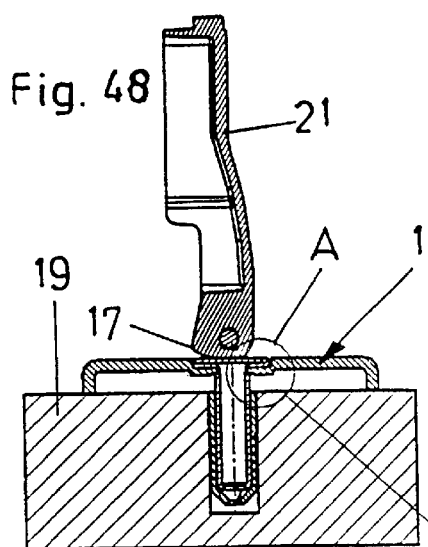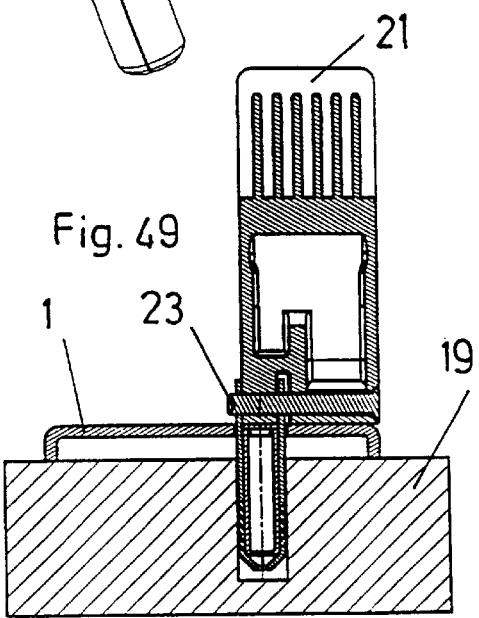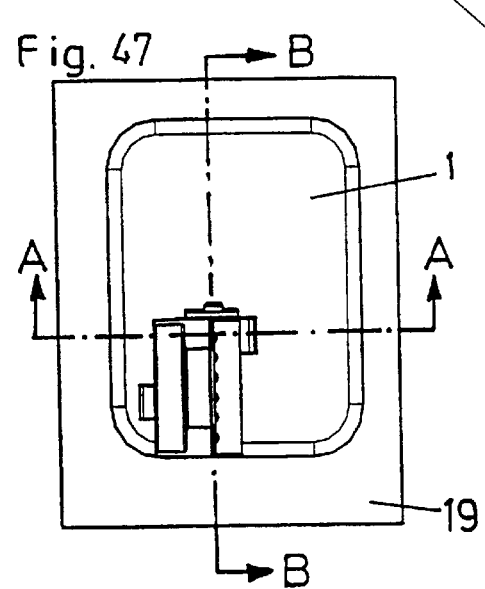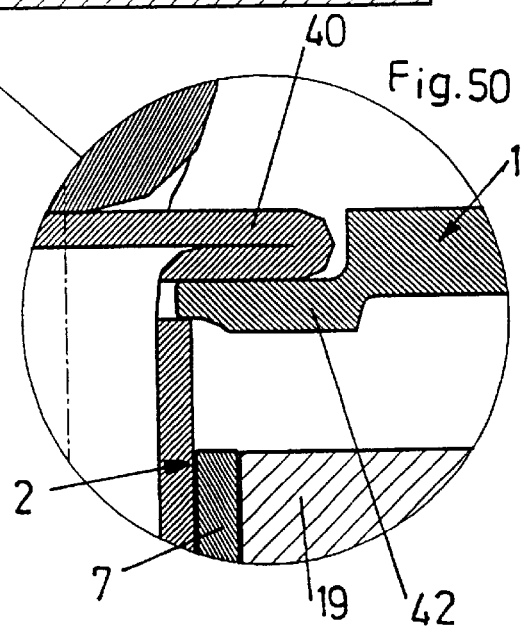

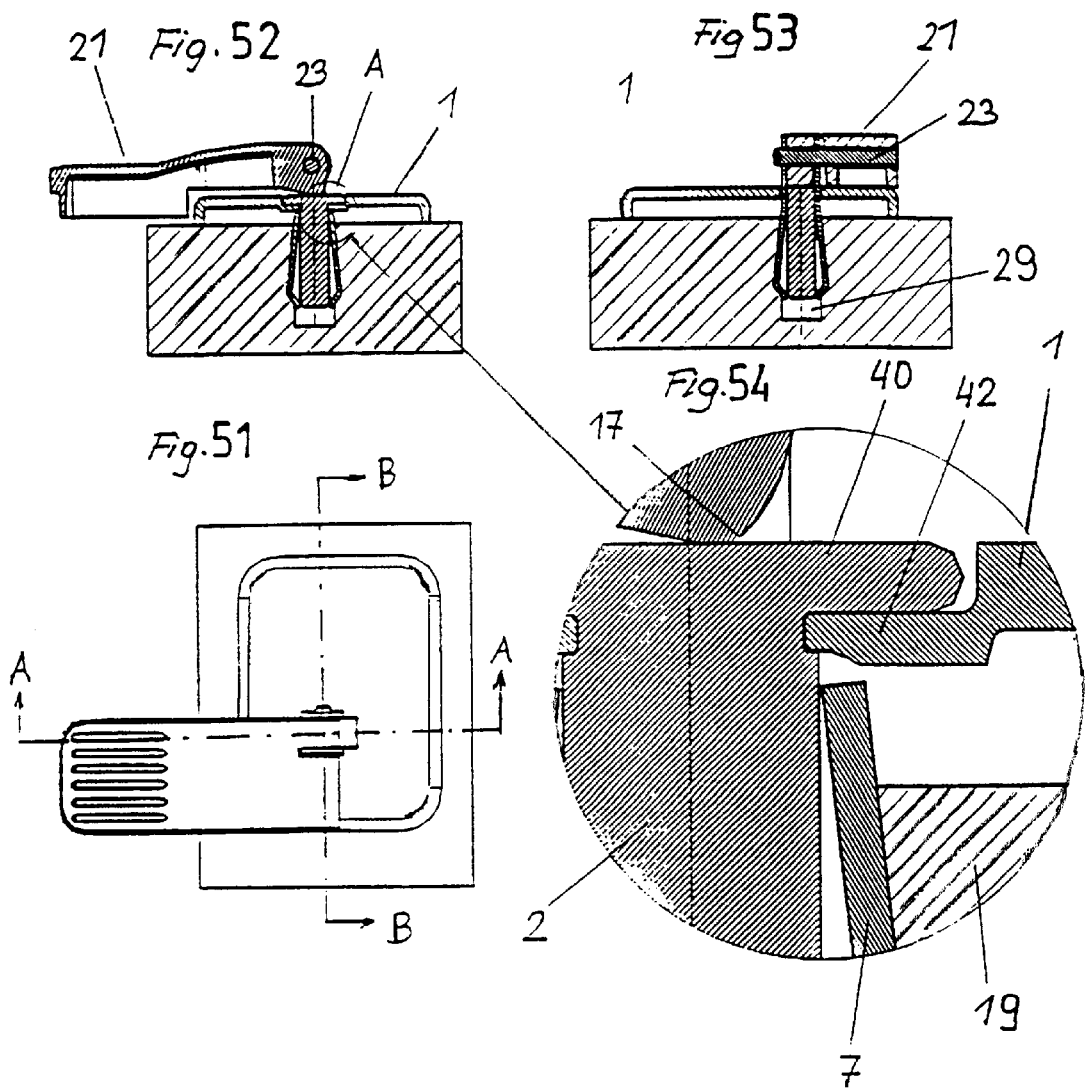

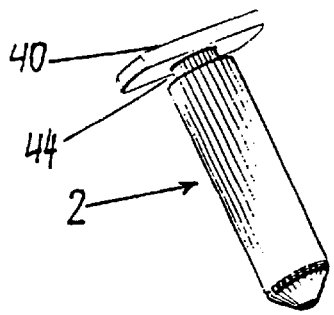
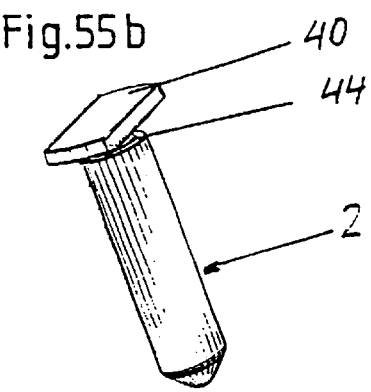
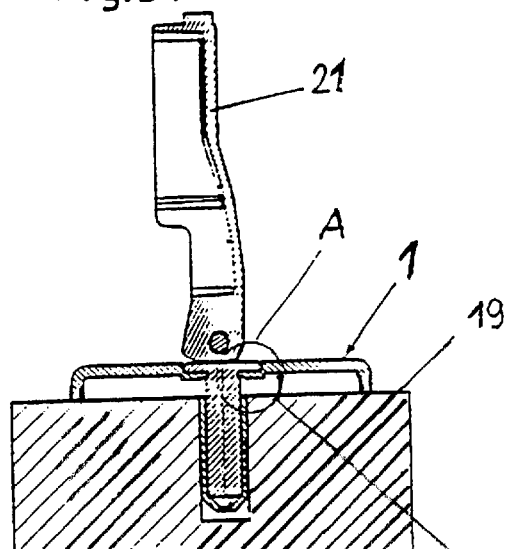
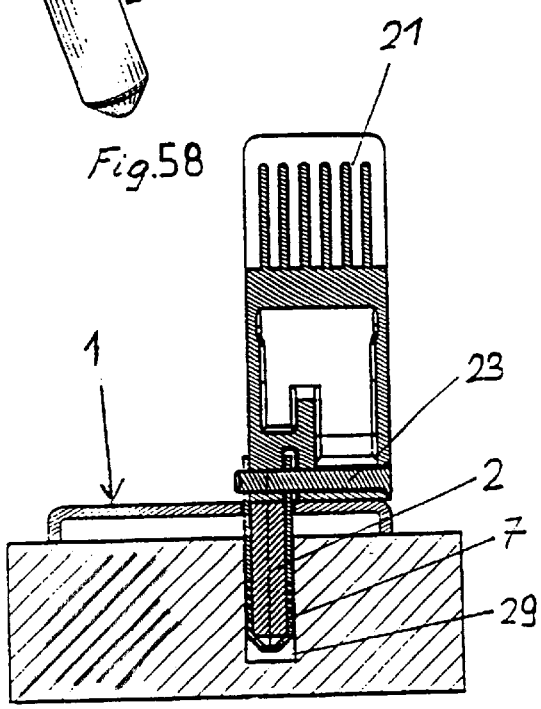
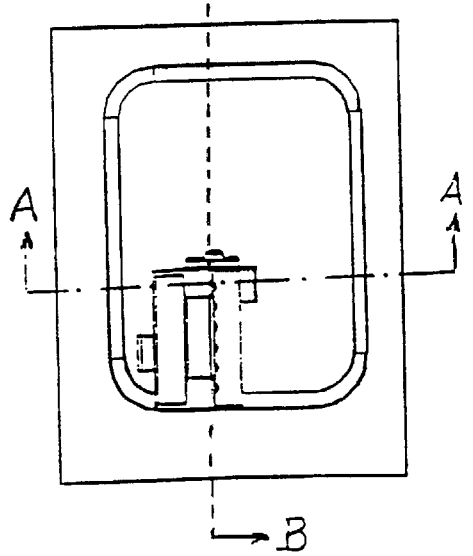
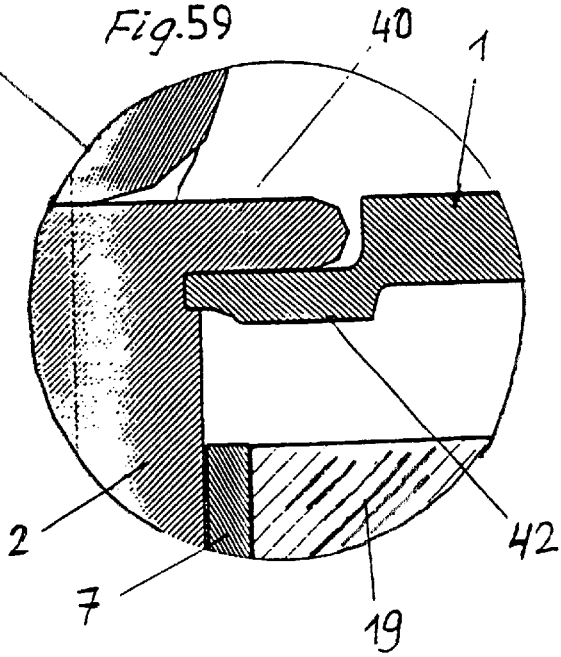

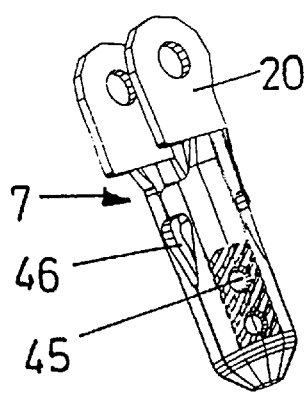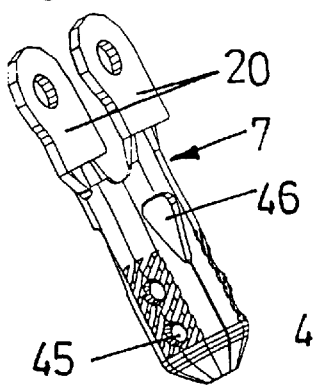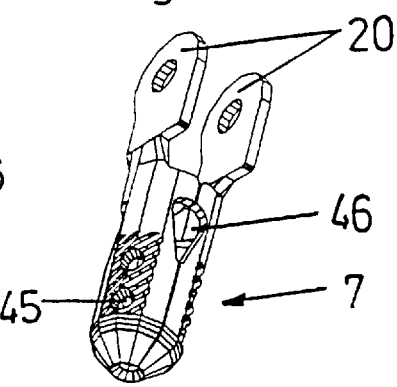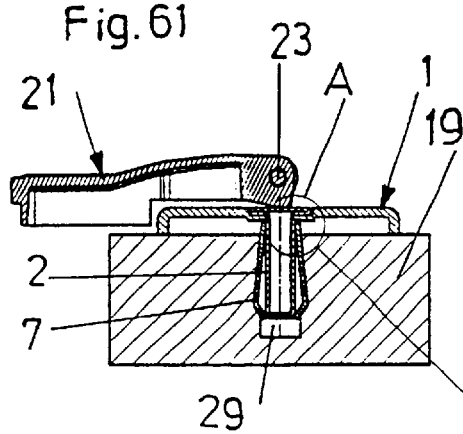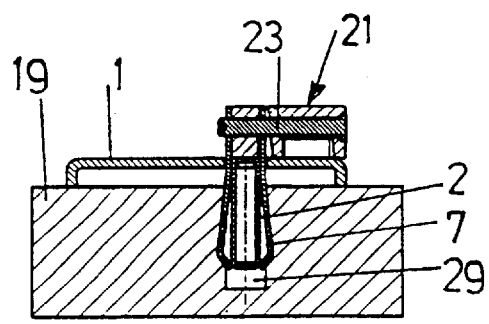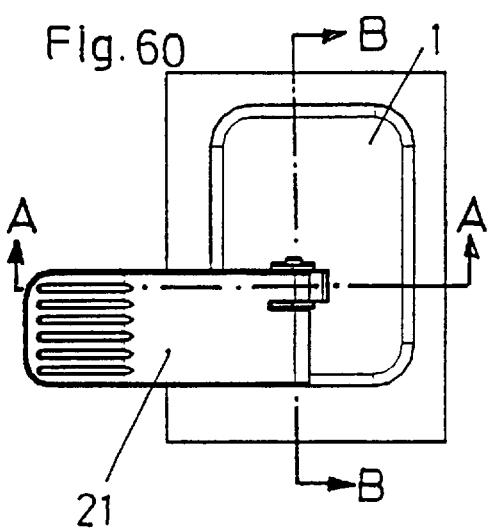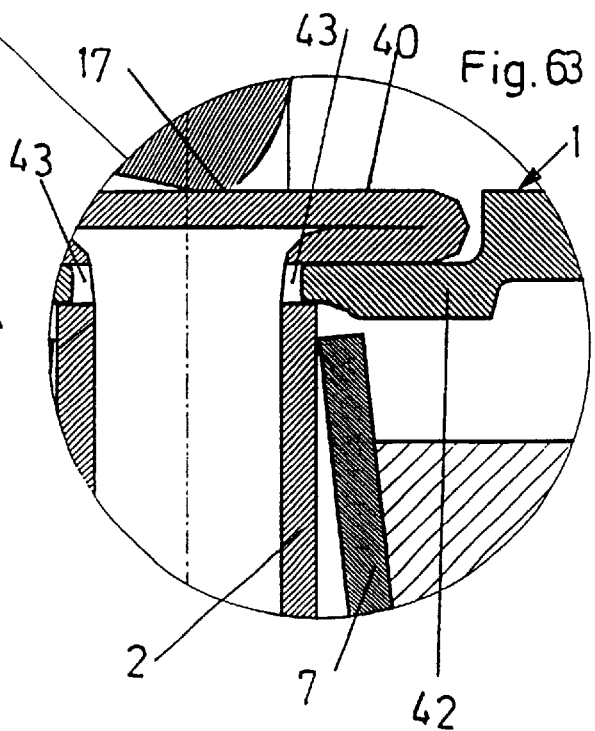

FURNITURE FITTING

BACKGROUND OF THE INVENTION

The invention relates to a fitting for detachable fastening to a furniture part. The fitting includes a fitting body abutting the furniture part and at least one dowel-like expansion sleeve which can be inserted into a drilled hole of the furniture part. The expansion sleeve has a casing of which is formed of a plurality of axially offset gripping projections, preferably with a conical tip. The fitting also includes a pin-shaped expansion portion for the expansion sleeve, which expansion portion projects through the fitting body. Arranged on the fitting body away from the furniture part is a clamping portion for the expansion sleeve, which clamping portion is preferably supported on the fitting body.

SUMMARY OF THE INVENTION

The problem addressed by the invention is to provide a furniture fitting which can be anchored in particularly small drilled holes, i.e. whose dowels or expansion sleeves and expansion portions have a very small diameter. However, the furniture fitting also needs to be held firmly on the furniture part. In particular, the drilled holes are likely to have a diameter of 5 mm, since these have become the unofficial standard in system drilling.

The problem addressed by the invention is solved by the expansion portion being held in an axially immovable manner in the fitting body and by the expansion sleeve being axially movable relative to the expansion portion and the fitting body by means of a clamping portion.

When the fitting is braced, the wooden material is therefore compressed in the dowel region, thus improving the dowel or expansion sleeve hold in the furniture part.

The expansion portion preferably has two radially projecting pegs which project in the expansion sleeve into guide slots which extend, at least in some regions, at an angle to the generatrices of the expansion sleeve.

In another embodiment of the invention, the expansion sleeve has two diametrically arranged and inward-projecting pegs which project into grooves or slots of the expansion portion, which grooves or slots extend, at least in some regions, at an angle to the generatrices of the expansion portion.

The expansion sleeve is also preferably anchored in the fitting body by means of an anti-torsion device, and the expansion portion can be twisted relative to the expansion sleeve by means of a handle or tool-accommodating portion.

According to one embodiment of the invention, the expansion sleeve has, at its extremity facing the fitting body, an outwardly flanged collar by which it is secured in an annular traction portion having two brackets which project through separate slots of the fitting body and which, on the fitting body side further from the furniture part, are articulated on a clamping portion which is preferably in the form of a rocker arm.

According to another embodiment of the invention, the expansion portion is inserted from the visible surface of the fitting body through the body and, by compression of the fitting body, is secured therein and has, at its extremity on the fitting body side, a stop which abuts the fitting body on the visible surface side.

The expansion sleeve is also preferably anchored in the fitting body by means of an anti-torsion device, and the expansion portion can be twisted relative to the expansion sleeve by means of a handle or tool-accommodating portion.

The expansion sleeve is also preferably provided in the casing with openings which pass radially therethrough.

The expansion portions are preferably made from a metal, in particular from quenched and tempered steel. The walls of the expansion sleeves can then be kept very thin. Their thickness does not exceed 1 mm and is preferably between 0.7 and 0.8 mm. The expansion sleeve is preferably coated by means of phosphating.

BRIEF DESCRIPTION OF THE DRAWINGS

Various embodiments of the invention are described below with reference to the Figures in the accompanying drawings, in which:

FIGS. 1 and 2 are each: a representation of a furniture fitting according to the invention;

FIG. 3 is: a representation of a furniture fitting according to the invention, with the parts shown disassembled;

FIG. 7 is: a section along the line A—A in FIG. 4;

FIG. 7a is: a section along the line A in FIG. 7;

FIG. 8 is: a plan view of a furniture fitting according to the invention;

FIG. 9 shows: the position of the retaining peg in the guide slot with the handle in the position shown in FIG. 8;

FIG. 10 is: a section along the line B—B in FIG. 8;

FIG. 10a is: an enlarged view of section A in FIG. 10;

FIG. 12 is: a further plan view of a fitting portion according to the invention;

FIG. 13 shows: the position of the retaining peg in the guide slot with the handle in the position shown in FIG. 12;

FIG. 14 is: a section along with the line B—B in FIG. 12;

FIG. 14a is: an enlarged view of section A in FIG. 14;

FIG. 15 is: a section along the line A—A in FIG. 12;

FIG. 15a is: an enlarged view of section A in FIG. 12;

FIGS. 16 and 17 are each: a representation of a further embodiment of a fitting according to the invention;

FIG. 18 is: a representation of the fitting with the parts shown disassembled;

FIG. 19 is: a plan view of the fitting according to the invention;

FIG. 20 is: a section along the line A—A in FIG. 19;

FIG. 20a is: an enlarged view of an encircled section in FIG. 20;

FIG. 21 is: a section along the line B—B in FIG. 19;

FIG. 21a is: an enlarged view of an encircled section in FIG. 21;

FIG. 22 is: a section along the line A—A in FIG. 19 with the expansion sleeve shown in a spread-apart position;

FIG. 22a is: an enlarged section of an encircled section in the FIG. 22;

FIG. 23 is: a section along the line B—B in FIG. 19 with the expansion sleeve shown in a spread-apart position;

FIG. 23a is: an enlarged view of an encircled section in FIG. 23;

FIG. 24 is: a cross-section through the fitting according to the invention;

FIG. 24a is: an enlarged view of section A in FIG. 24;

FIG. 25 is: a section along the line B—B in FIG. 24;

FIG. 25a is: an enlarged view of section A in FIG. 25;

FIGS. 26 and 27 are each: a representation of a further embodiment of the fitting;

FIG. 28 is: a representation of this embodiment of the fitting with the parts shown disassembled;

FIG. 29 is: a plan view of this embodiment;

FIG. 30 is: a section along the line A—A in FIG. 29;

FIG. 30a is: an enlarged view of an encircled section in FIG. 30;

FIG. 31 is: a plan view of a fitting according to the invention with the clamping lever in the clamping position;

FIG. 32 is: a section along the line A—A line in FIG. 31;

FIG. 32a is: an enlarged section of an encircled section in FIG. 32;

FIGS. 33 and 34 are each: a representation of a further embodiment of a fitting according to the invention;

FIG. 35 is: a representation of an embodiment of the fitting shown in FIGS. 33 and 34 with the individual parts shown disassembled:

FIG. 39 is: a plan view of this embodiment of a fitting according to the invention;

FIG. 40 is: a section along the line A—A in FIG. 39;

FIG. 40a is: an enlarged section of an encircled section in FIG. 40;

FIG. 41 is: a plan view of a further embodiment of a fitting according to the invention;

FIG. 42 is: a section along the line A—A in FIG. 41;

FIG. 43 is: a plan view of this embodiment of a fitting with the handle shown in the release position;

FIG. 44 is: a section along the line A—A in FIG. 43;

FIGS. 46a and 46b are: a representation of the expansion portion with a solid body and a cylindrical portion;

FIG. 47 is: a plan view of a fitting according to the invention;

FIG. 48 is: a section along the line A—A in FIG. 47;

FIG. 49 is: a section along the line B—B in FIG. 47;

FIG. 50 is: the cutaway portion A in FIG. 48;

FIG. 51 is: a plan view of a fitting according to the invention in the braced position;

FIG. 52 is: a section along the line A—A in FIG. 51;

FIG. 53 is: a section along the line B—B in FIG. 51;

FIG. 54 is: the cutaway portion A in FIG. 52;

FIGS. 55a and 55b are each: a representation of a further embodiment of an expansion portion;

FIG. 56 is: a further plan view of a fitting portion according to the invention;

FIG. 57 is: a section along the line A—A in FIG. 56;

FIG. 58 is: a section along the line B—B in FIG. 56;

FIG. 59 is: the cutaway portion A in FIG. 57;

FIG. 60 is: a plan view of the fitting according to the invention in the clamping position;

FIG. 61 is: a section along the line A—A in FIG. 60;

FIG. 62 is: a section along the line B—B in FIG. 60;

FIG. 63 is: the cutaway portion A in FIG. 61;

FIGS. 64a, b and c are: representations of the expansion sleeve;

DESCRIPTION OF THE PREFERRED EMBODIMENTS

Figure 6A:
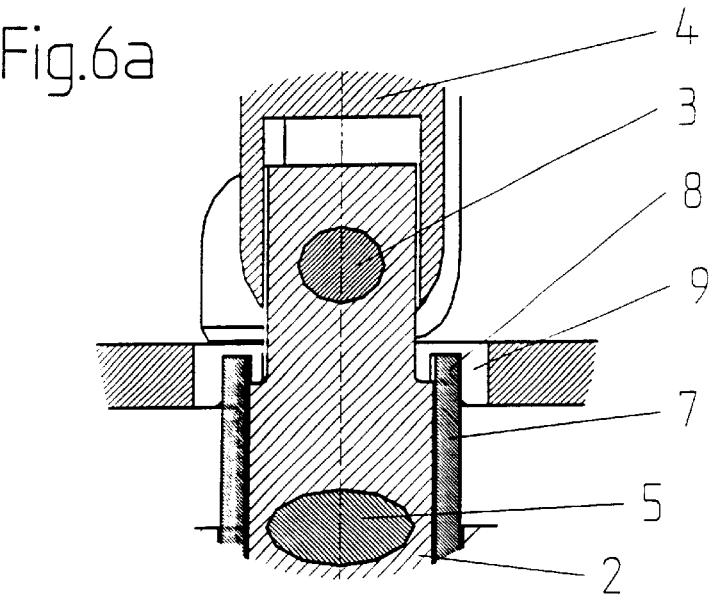
FIG. 6a is: an enlarged view of section A in FIG. 6.

In the embodiment shown in FIGS. 1 to 15, the furniture fitting according to the invention comprises a fitting body 1, which is, for example, in the form of a base plate for a hinge arm, an expansion sleeve 7, a pin-shaped expansion portion 2 and a handle 4. A peg-shaped pin 3 is provided for connecting the handle 4 to the expansion portion 2.

The expansion sleeves 7 are of a dowel-like design and are formed by very thin sleeves, preferably made from quenched and tempered or hardened steel. The expansion sleeves 7 are preferably surface-treated. In the embodiments the expansion sleeve casing face is designed to be phosphated. On its casing the expansion sleeve 7 has a plurality of axially offset rib-like projections which improve the hold in a wooden casing of a furniture part 19. The expansion portions 2 may be of both metal and plastics. Preferably, however, a metal is used, in particular a quenched and tempered or hardened steel. The expansion portion 2 may be in the form of both a pin with a solid body and a cylindrical sleeve (FIGS. 46a and 46b).

On the side of the fitting body 1 further from the furniture part 19 the expansion portion 2 is articulated, by means of a bolt, on a clamping portion, which is in the form of the handle 4. The handle 4 is directly supported on the fitting body 1, and the expansion portion 2 can be rotated by means of the handle 4.

The expansion portion 2 furthermore projects through an opening in the fitting body 1, which opening is formed by two slots 9 and segment-like recesses 9'.

The expansion portion 2 has an opening 10 into which a bolt 5 is inserted. The bolt 5 projects from both sides of the expansion portion 2 and, with its extremities, which act as retaining pegs, it projects into guide slots 6 in the expansion sleeve 7. The guide slots 6 have a region 6' extending in the circumferential direction of the expansion sleeve 7 and a region 6" aligned at an angle to the generatrices of the expansion sleeve 7 having a cylindrical casing.

The expansion sleeve 7 also has two tabs 8 which, in the assembled state, project into the slots 9 of the fitting body 1 and form an anti-torsion device for the expansion sleeve 7.

The expansion sleeve 7 is also provided with longitudinal slots 35 and, at its free extremity, has obliquely inwardly angled tabs 36 which cover the front of the expansion portion 2.

Figure 6:
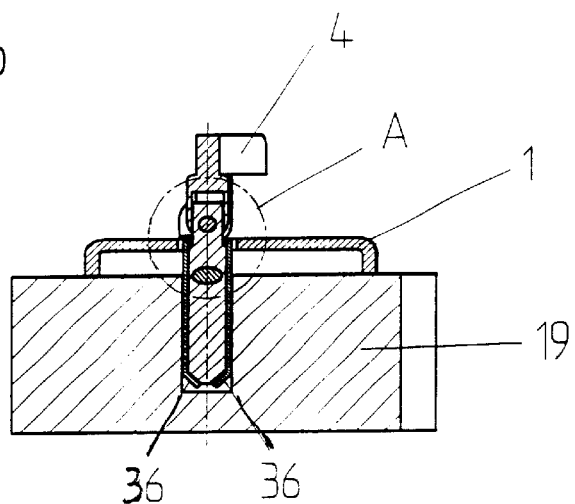
FIG. 6 is: a section along the line B—B in FIG. 4.
Figure 4:
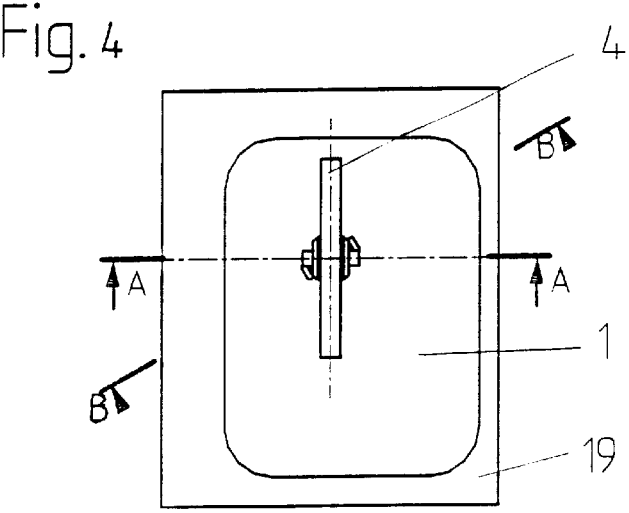
FIG. 4 is: a plan view of a fitting according to the invention.
Figure 5:
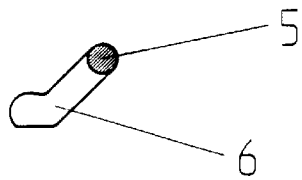
FIG. 5 shows: the position of one of the retaining pegs in the guide slot with the handle in the position shown in FIG. 4.
Figure 11A:
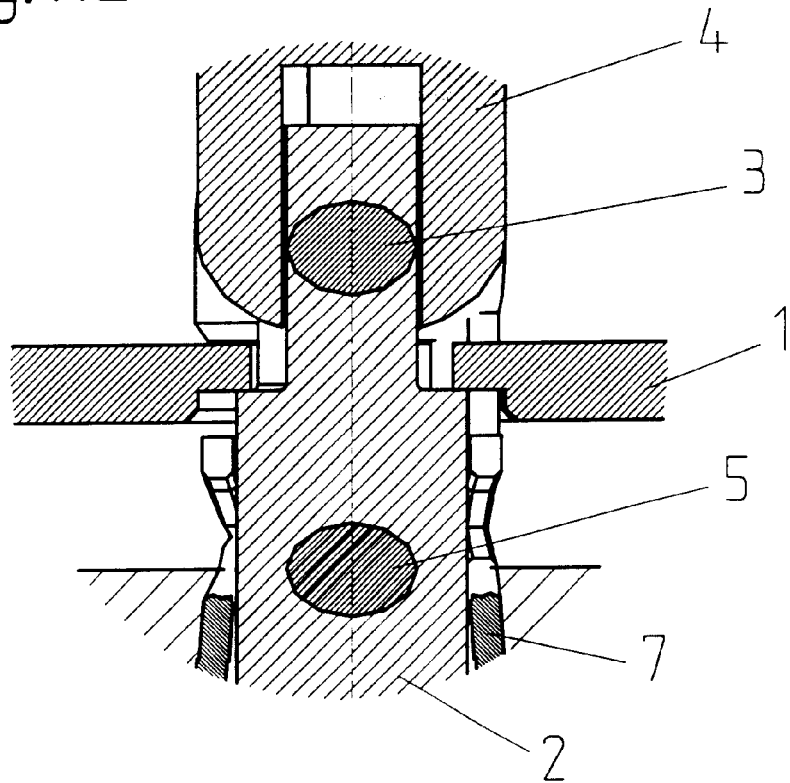
FIG. 11a is: an enlarged view of section A in FIG. 11.
Figure 11:
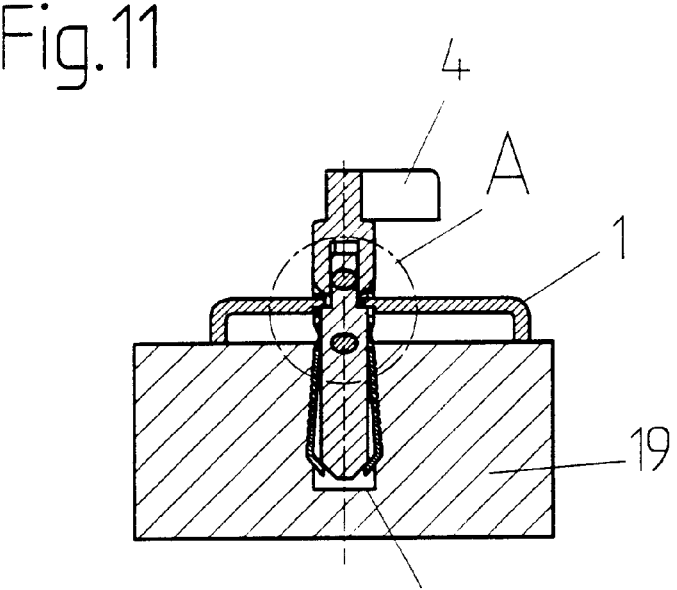
FIG. 11 is: a section along the line A—A in FIG. 8.
Figure 38:
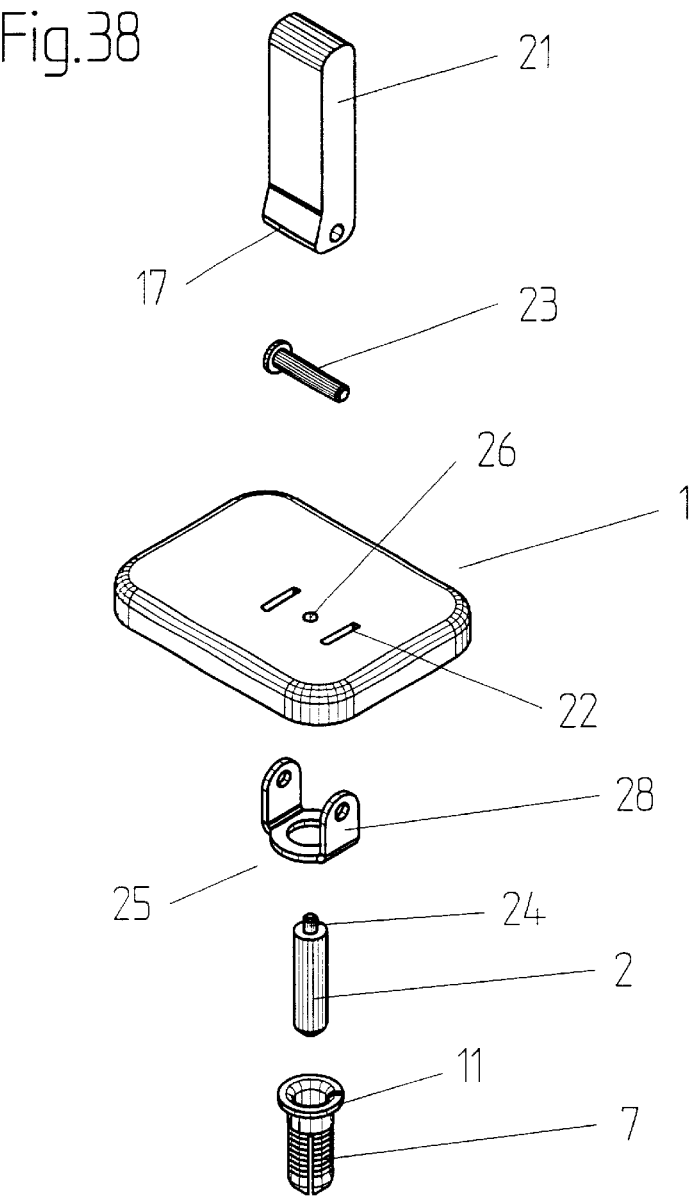
FIG. 38 is: a representation of this embodiment with the parts shown disassembled.
Figure 36:
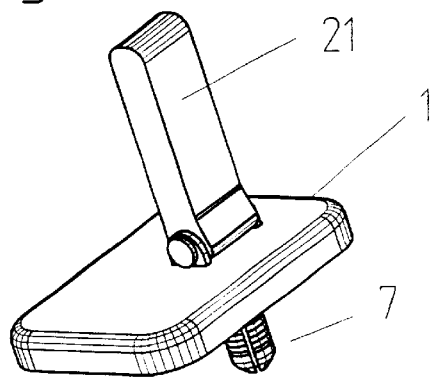
FIGS. 36 and 37 are each: a representation of a further embodiment of a fitting according to the invention.
Figure 37:
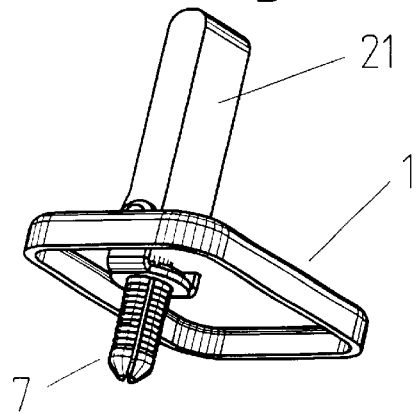
Figure 45:
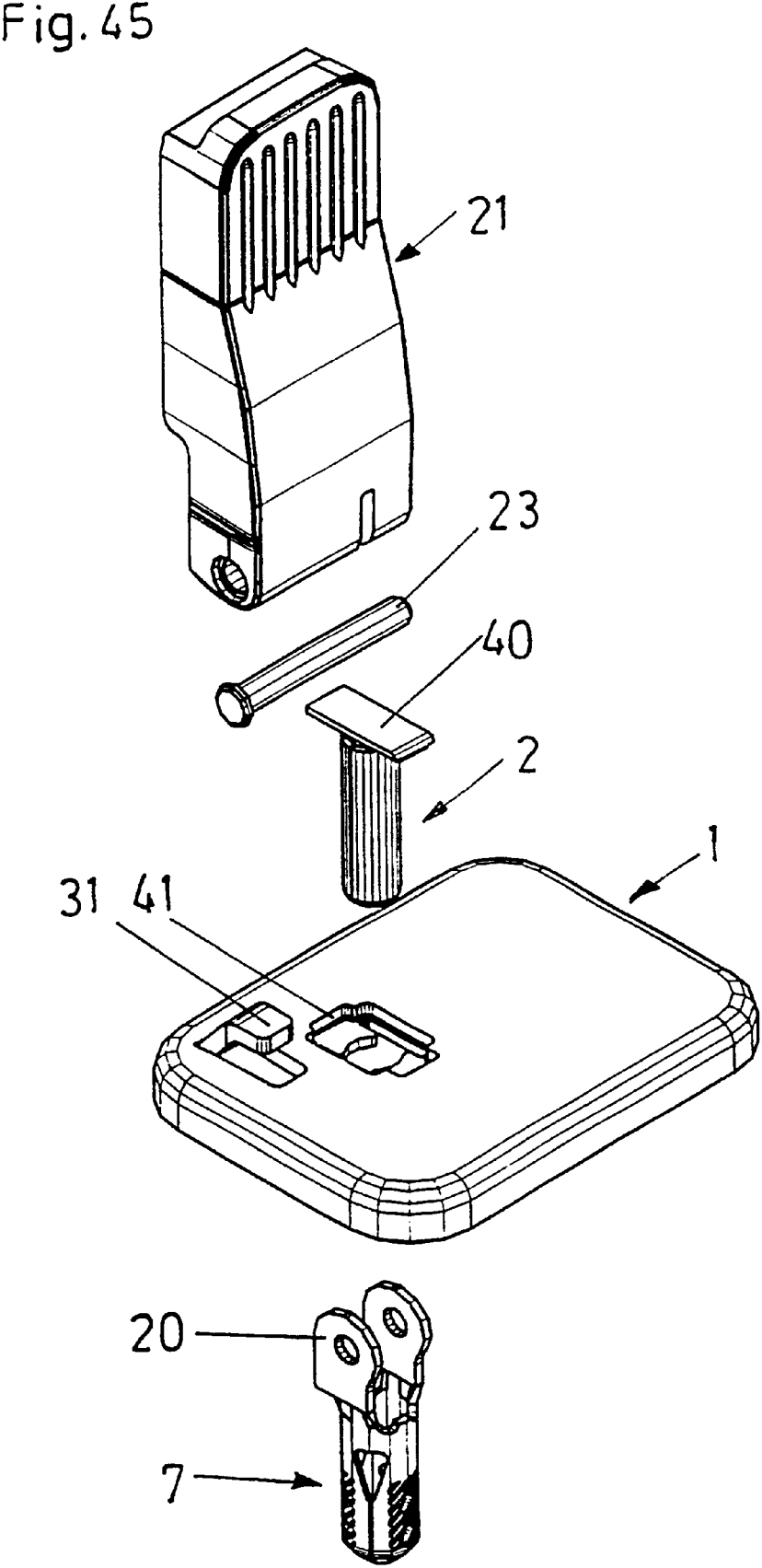
FIG. 45 is: a representation of a furniture fitting according to the invention with the parts shown disassembled.

During assembly of the fitting body 1, as FIGS. 4 and 6 show, the body 1 is placed on the furniture part 19 and, together with the expansion portion 2, the expansion sleeve 7 is inserted into the drilled hole 29 in the furniture part 19. At this time, as shown in FIGS. 6 and 7, the expansion sleeve 7 is unbraced. The bolt 15 is in the guide slots in the position shown in FIG. 5.

The expansion portion 2 is provided with grooves 15 (FIG. 7A), into which project projections 38 of the fitting body 1. This prevents an axial movement of the expansion portion 2 relative to the fitting body 1.

To brace the expansion sleeve 7 and secure the fitting body 1 to the furniture par 19 the handle 4 is turned, causing a movement of the bolt 5 relative to the expansion sleeve 7 in the guide slots 6. During this process, as shown in FIGS. 9 and 10, the expansion sleeve 7 is raised, i.e. slightly withdrawn from the drilled hole 29 in the furniture part 19, while the expansion portion 2 is held in an axially immovable manner in the fitting body 1. The expansion sleeve 7 thus spreads apart as shown in FIG. 10. FIG. 9 shows the position of the bolt 5 in the guide slots when the handle 4 is in the intermediate position shown in FIG. 8.

The tabs 8, which are held in the slots 9 of the fitting body 1, prevent the expansion sleeve 7 from co-rotating with the handle 4 and the expansion portion 2.

Finally, in order to brace the expansion sleeve 7 in the furniture part 19, the handle 4 is brought into the end position shown in FIG. 12, the bolt 5 inside the guide slots 6 being in the position shown in FIG. 13. As shown in FIGS. 14 and 15, the expansion sleeve 7 is pressed apart to the maximum and is firmly anchored in the drilled hole 29 of the furniture part 19.

The front face of the expansion sleeve 7 facing the handle 4 is covered by the fitting body 1 (see FIG. 15a), which means that the expansion sleeve 7 cannot be withdrawn too far from the drilled hole 29.

In the embodiment shown in FIGS. 16 to 25, the expansion portion 2 is formed in one piece with a tool-accommodating portion 13 in the form of a screw head. In the embodiment the tool accommodating portion 13 is provided with a cross recess for a screwdriver for recessed-head screws.

The expansion sleeve 7 differs from the expansion sleeve 7 of the previous example in that it has on its inner casing pegs 16 which perform the function of the bolt 5 of the previous embodiment.

The expansion portion 2 is provided with grooves 12 which correspond to the guide slots 6 of the previous embodiment and into which project the pegs 16 of the expansion portion 2. Like the guide slots 6, the grooves 12 are of an angled design with a region extending along a circumferential line of the expansion portion 2 and a region at an angle to the fitting body 1. The guide function of the grooves 12 corresponds to that of the guide slots 6. The expansion portion 2 could also be designed with a sleeve which is connected to the tool-accommodating portion 13 and which, instead of the grooves 12, again has guide slots for the pegs 16'.

The expansion sleeve 7 again has pegs 8 which project into slots 9 in the fitting body 1 and which act as an anti-torsion device for the expansion sleeve 7.

To secure the fitting body 1, the body is brought to abut the furniture part 19 with the expansion portion 2 and the expansion sleeve 7, as shown in FIGS. 20 and 21. The expansion sleeve 7 is unbraced and can therefore be inserted easily into the drilled hole 29 in the furniture part 19.

Turning the expansion portion 2 with a screwdriver causes the expansion sleeve 7 to spread apart, as shown in FIGS. 22, 23 and 25, and to be anchored in the drilled hole 29 of the furniture part 19.

To prevent the expansion portion 2 from being accidentally withdrawn from the drilled hole 29 in the furniture part 19 when the expansion sleeve 7 is released, the fitting body 1 is provided with projections 18 which are directed towards the expansion portion 2 and which the expansion portion 2 abuts with a shoulder when the expansion portion is moved out of the drilled hole 29. The expansion portion 2 is anchored in the fitting body 1 by the projections 18. When the fitting is assembled, the projections 18 are aligned approximately perpendicularly to the surface of the fitting body 1 before the expansion portion 2 is inserted. After the expansion portion 2 has been inserted into the fitting body 1, the projections 18 are compressed so that they occupy the position shown in FIGS. 21 and 23 and lock the expansion portion 1 in the fitting body 1.

In the embodiment shown in FIG. 25 the fitting body 1 has a collar 33 which projects into the drilled hole 29. At the same time, the tabs 8 of the expansion sleeve 7 are accommodated in slots in the collar 33. As in the previous embodiment, the expansion portion 2 is locked in the fitting body by means of projections of the fitting body 1. The projections protrude out from collar 33, forming on the one hand nubs 33', which act as a guide for the expansion portion 2 and, on the other hand, frontal stops for the shoulder of the expansion portion 2, the stops preventing the expansion portion 2 from being pressed out of the fitting body 1 and hence out of the drilled hole 29. The fact that the expansion portion 2 is axially anchored in the fitting body 1 means that, when the fitting is detached, the expansion sleeve 7 is pressed securely into the drilled hole 29 and is detached from the wall of the drilled hole 29.

In the embodiment shown in FIG. 25 the fitting body 1 closely abuts the furniture part 19.

In the embodiment the pegs 16 are formed by pot-like nubs of the expansion sleeve 7.

In the embodiment shown in FIGS. 26 to 32 the expansion sleeve 7 is provided with two brackets 20 having holes through which projects a bolt 23, by means of which the expansion sleeve 7 is articulated on a rocker arm 21. The rocker arm 21 acts as a clamping portion for the expansion sleeve 7.

In this case the brackets 20 project through slots 22 in the fitting body 1.

The expansion portion 2 is in cylindrical form and has a peg 24 which can be inserted into a hole 26 in the fitting body 1. The peg 24 is preferably riveted in the fitting body 1.

The rocker arm 21 is provided with a cam 17 by which it is supported in the clamping position on the fitting body 1.

In the position shown in FIGS. 26 and 30 the rocker arm 21 is in the release position and the expansion sleeve 7 can be inserted with the expansion portion 2 into the drilled hole of the furniture part 19. The rocker arm 21 is subsequently rocked into the position shown in FIG. 31, whereupon the expansion sleeve 7 is pulled towards the fitting body 1 by means of the bolt 23 and the brackets 20 and is spread apart as shown in FIG. 32.

In the embodiment shown in FIGS. 33 and 35 the expansion sleeve 7 is formed by two complementary half-dishes 27 which again have brackets 20, by means of which they are secured by the bolt 23 and thus to the rocker arm 21. As in the previous embodiment the expansion portion 2 is provided with a peg 24 which can be inserted into a hole 26 in the fitting body 1. Again, as in the previous embodiment, the expansion sleeve 7 is formed by the two half-dishes 27 is braced in the drilled hole 29 of the furniture part 19 by the rocking of the rocker arm 21, during which process the half-dished are pulled towards the fitting body 1.

In the embodiment shown in FIGS. 36 to 40 the expansion sleeve 7 is secured in an annular traction portion 25 having two brackets through slots 22 in the fitting body 1 and are secured by a bolt 23 connecting the brackets 28 to the rocker arm 21.

The expansion portion 2 is of the same design as in the previous embodiment.

The cylindrical expansion sleeve 7 has an outwardly unflanged collar 11 by which it is secured in the traction portion 25.

In the region of the traction portion 25 the expansion sleeve 7 is preferably provided with a compressed portion 30 to ensure that the expansion sleeve 7 is held tightly in the traction portion 25. The expansion sleeve is again spread apart by rocking the rocker arm 21, which is shown in the release position in the Figures.

In the embodiment shown in FIGS. 41 and 44 a hook 31 is punched out of the fitting body 1, under which hook a lug 32 of the rocker arm 21 engages when the clamping lever is in the release position. This makes it possible to remove the fitting body 1 from the furniture part 19 by means of the rocker arm 21 or to withdraw the expansion sleeve 7 from the drilled hole 29 in the furniture part 19 without the rocker arm 21 exerting traction on the expansion sleeve 7 or the expansion portion 2.

When the rocker arm 21 is in the clamping position, the lug 32 abuts the fitting body 1.

In most of the embodiments shown, the fitting body 1 is in the form of a plate with a collar 14 which is supported on the furniture part 19. When the expansion sleeve 7 is clamped, the fitting body 1 is preferably pushed slightly through to produce resilient bracing.

In the embodiment shown in FIGS. 45 to 66 sleeve 7 is again provided with two brackets 20 having holes through which projects the bolt 23, by means of which the expansion sleeve 7 is articulated on the rocker arm 21. The rocker arm 21 is again provided with a cam 17 by which it is supported in the clamping position on the expansion portion 2.

At the same time, the brackets 20 project through an opening or openings in the fitting body 1.

In the position shown in FIGS. 45, 47, 48 and 49 the rocker arm 21 is in the release position and the expansion sleeve 7 can be inserted with the expansion portion 2 into the drilled hole 29 of the furniture part 19. The rocker arm 21 is subsequently rocked into the position shown in FIGS. 51, 52 and 53, whereupon the expansion sleeve 7 is pulled towards the fitting body 1 by means of the bolt 23 and the brackets 20 and is spread apart.

The expansion sleeve 7 may also be formed by two complementary dishes which complement each other to form a closed sleeve and which again have brackets 20 by means of which the dishes are secured in the bolt 23 and hence in the rocker arm 21.

When the fitting is assembled, the expansion portion 2 is inserted from the visible side of the fitting body 1 through the opening 9 and, on the assembly side of the fitting body 1, projects from the body. At its extremity on the fitting body side, the expansion portion 2 is, furthermore, provided with a small plate 40 which, on the visible surface side, is accommodated in a recess 41 of the fitting body 1.

The expansion sleeve 7 is secured in the fitting body 1 from the assembly side and projects with its brackets 20 through openings in the fitting body 1.

On its side facing the furniture wall 19, i.e. on the assembly side, the recess 41 is defined by brackets 42 which have been compressed after the expansion portion 2 has been secured in the fitting body 1, whereby the expansion portion 2 is anchored in the fitting body 1 in a captive manner. At the same time, the tabs 42 project either into holes 43 of the sleeve-shaped expansion portion 2 or into an annular groove 44 of the expansion portion 2 if this is in the form of a full cylinder. In this case the annular groove 44 is defined by the small plate 40 and the cylindrical body of the expansion portion 2.

As FIG. 50 in particular shows, the small plate 40 may be folded and thus of a reinforced design.

As shown in FIGS. 64a to 64c, the expansion sleeve 7 is provided with openings 45 and 46. The openings 45 are circular and the openings 46 are pear-shaped or triangular.

The openings 45, 46 can also be in the form of a recess on the borders of the expansion sleeve 7 formed by two dishes, in which case the recesses complement each other to form a circumferentially closed opening when the expansion sleeve 7 is assembled.

Figures 65, 66:
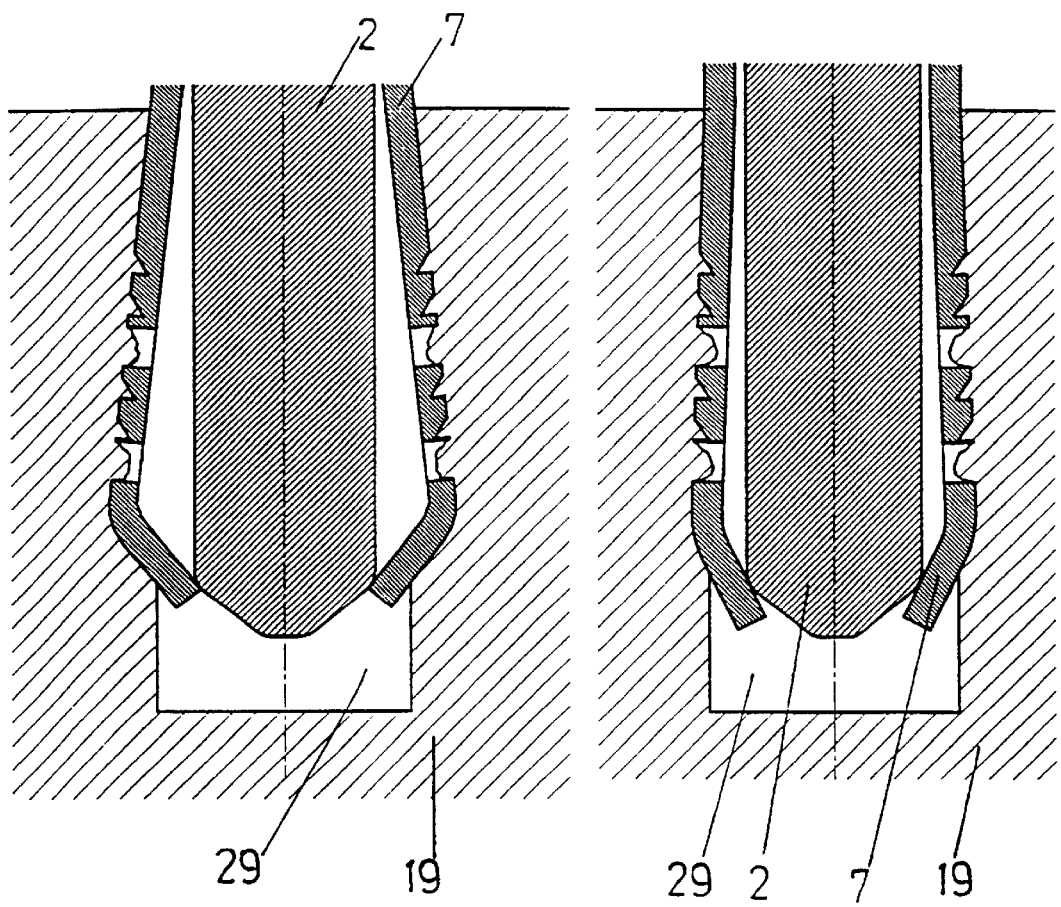
FIG. 65 is: a longitudinal section through the expansion portion and the expansion sleeve when anchored in soft wood.
FIG. 66 is: a longitudinal section through the expansion portion and the expansion sleeve when anchored in hardwood.

These openings 45, 46 improve the deformability of the expansion sleeve 7, thus reinforcing its hold in the wooden material, particularly in the case of a soft material. The hold of the expansion sleeve 7 in the furniture wall 19 is further improved by the fact that, when the said sleeve is spread apart, portions of the wooden material penetrate the holes 45, 46 as shown in FIGS. 65 and 66 and, as it were, interlock with the expansion sleeve 7.

What is claimed is:

1. A fitting for detachable fastening to a furniture part, wherein the furniture part includes a small drilled hole formed therein, said fitting comprising:

a fitting body;

at least one expansion sleeve having a casing which includes a plurality of axially offset gripping projections, said expansion sleeve being adapted to be inserted in the hole of the furniture part;

an expansion portion projecting through said fitting body and received in said casing of said expansion sleeve, said expansion portion arranged for expansion of said expansion sleeve; and a clamping portion for said expansion sleeve, said clamping portion being supported on a side of said fitting body away from the furniture part, wherein said expansion portion is held in an axially immovable manner in said fitting body and wherein said expansion sleeve is axially movable relative to said expansion portion and said fitting body via said clamping portion.

2. A fitting as claimed in claim 1, wherein said expansion portion comprises a cylindrical portion with a conical extremity extending away from said fitting body.

3. A fitting as claimed in claim 1, wherein the expansion portion has two radially projecting pegs which project in the expansion sleeve into guide slots which extend, at least in some regions, at an angle to the generatrices of the expansion sleeve.

4. A fitting as claimed in claim 3, wherein the guide slots are of an angled design, having a region extending along a circumferential line of the expansion sleeve and a region at an angle to the fitting body.

5. A fitting as claimed in claim 3, wherein the pegs are formed by the extremities of a bolt which projects through a diametrically drilled hole in the expansion portion.

6. A fitting as claimed in claim 3, wherein the expansion sleeve has two diametrically arranged and inward-projecting pegs which project into grooves or slots of the expansion portion, which grooves or slots extend, at least in some regions, at an angle to the generatrices of the expansion portion.

7. A fitting as claimed in claim 6, wherein the grooves are of an angled design, having a region extending along a circumferential line of the expansion portion and a region angled towards the fitting body.

8. A fitting as claimed in claim 6, wherein the pegs are pressed in a pot-like manner from the wall of the expansion sleeve.

9. A fitting as claimed in claim 1, wherein the fitting body is in the form of a flexible plate with a collar which is supported on the furniture part in the assembly position.

10. A fitting as claimed in claim 1, wherein said expansion portion has a shoulder which abuts said fitting body.

11. A fitting as claimed in claim 10, wherein said expansion portion has a casing with at least one groove, into which said fitting body projects.

12. A fitting as claimed in claim 1, wherein said fitting body includes two separate slots formed therethrough, and said expansion sleeve includes two brackets which project through said slots so that said brackets are articulated on said clamping portion.

13. A fitting as claimed in claim 12, wherein said clamping portion comprises a rocker arm.

14. A fitting as claimed in claim 1, wherein the expansion sleeve is formed by two complementary half-dishes.

15. A fitting as claimed in claim 1, wherein the expansion sa its extremity facing the fitting body, an outwardly flanged collar by which the said sleeve is secured in an annular traction portion having two brackets which project through separate slots of the fitting body and which, on the side of the fitting body further from the furniture part, are articulated on a clamping portion which is preferably in the form of a rocker arm.

16. A fitting as claimed in claim 1, wherein the rocker arm has a lug with which, in the release position, the said arm engages behind a hook formed on the fitting body.

17. A fitting as claimed in claim 16, wherein the hook is punched out of the plate-shaped fitting body.

18. A fitting as claimed in claim 16, wherein the lug of the rocker arm abuts the hook in the release position and the fitting body in the clamping position.

19. A fitting as claimed in claim 1, wherein the fitting body has projections which extend towards the furniture part and lock the expansion portion in an axial direction.

20. A fitting as claimed in claim 19, wherein the projections are compressed towards the expansion portion.

21. A fitting as claimed in claim 1, wherein from the visible surface of the fitting body, the expansion portion is inserted through the said body and, by compression of the fitting body, is secured therein and has, at its extremity on the fitting body side, a stop which abuts the fitting body on the visible surface side.

22. A fitting as claimed in claim 1, wherein said expansion portion is made from quenched and tempered steel.

23. A fitting as claimed in claim 1, wherein said expansion portion is made from hardened steel.

24. A fitting as claimed in claim 1, wherein said expansion portion comprises a pin.

25. A fitting as claimed in claim 1, wherein said expansion portion comprises a cylindrical sleeve.

26. A fitting as claimed in claim 1, wherein the stop is in the form of a small plate frontally arranged or formed on the expansion portion.

27. A fitting as claimed in claim 26, wherein the small plate is accommodated in an indentation on the visible surface side of the fitting body.

28. A fitting as claimed in claim 1, wherein said fitting body includes an opening and two brackets, said expansion portion projecting through said opening and held between said two brackets of said fitting body.

29. A fitting as claimed in claim 28, wherein said expansion portion comprises a pin with a groove, said brackets being arranged to project in said groove of said expansion portion.

30. A fitting as claimed in claim 28, wherein said brackets are compressed.

31. A fitting as claimed in claim 28, wherein the small plate is folded.

32. A fitting as claimed in claim 28, wherein said expansion portion comprises a cylindrical sleeve with an opening, said brackets being arranged to project into said opening of said sleeve-shaped expansion portion.

33. A fitting as claimed in claim 1, wherein said expansion sleeve comprises a dowel-shaped expansion sleeve having a conical tip.

34. A fitting as claimed in claim 1, wherein said expansion portion comprises a pin-shaped expansion portion.

35. A fitting for detachable fastening to a furniture part, wherein the furniture part includes a small drilled hole formed therein, said fitting comprising:

a fitting body having an opening formed therethrough, said fitting body including an assembly face and a visible surface;

at least one expansion sleeve having a casing which includes at least one opening passing radially therethrough, said expansion sleeve being adapted to be inserted in the hole of the furniture part;

an expansion portion projecting through said opening in said fitting body and received in said casing of said expansion sleeve, said expansion portion arranged for expansion of said expansion sleeve; and a clamping portion for said expansion sleeve, said clamping portion being supported on said visible surface of said fitting body, wherein said expansion sleeve is axially movable relative to said expansion portion and said fitting body via said clamping portion.

36. A fitting as claimed in claim 35, wherein the expansion sleeve is formed by two complementary dishes having on their lateral borders mutually opposite recesses which, when the expansion sleeve is in the unbraced position, complement each other to form a circumferentially closed opening.

37. A fitting as claimed in claim 35, wherein the openings are triangular or pear-shaped.

38. A fitting as claimed in claim 35, wherein circular or approximately circular openings are provided in the casing of the expansion sleeve.

39. A fitting as claimed in claim 35, wherein at least an outer surface of said expansion sleeve is provided with a phosphate layer coating.

40. A fitting as claimed in claim 35, said fitting body comprises a plate-shaped fitting body.

41. A fitting as claimed in claim 35, wherein said expansion portion comprises a pin-shaped expansion portion.

42. A fitting as claimed in claim 35, wherein said expansion sleeve has a conical tip.

* * * * *